(12) United States Patent
Keall et al.

(10) Patent No.: US 8,797,325 B2
(45) Date of Patent: Aug. 5, 2014

(54) METHOD AND SYSTEM FOR DECOMPOSING COMPLEX SHAPES INTO CURVY RHTS FOR RASTERIZATION

(75) Inventors: Gary Keall, Long Clawson (GB); David Emett, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 850 days.

(21) Appl. No.: 12/953,739

(22) Filed: Nov. 24, 2010

(65) Prior Publication Data

US 2011/0261059 A1 Oct. 27, 2011

Related U.S. Application Data

(60) Provisional application No. 61/328,541, filed on Apr. 27, 2010.

(51) Int. Cl.
*G06T 11/20* (2006.01)
(52) U.S. Cl.
USPC .......................................................... 345/442

(58) Field of Classification Search
None
See application file for complete search history.

(56) References Cited

U.S. PATENT DOCUMENTS 6,694,057 B1 * 2/2004 Miller et al. .................. 382/203

* cited by examiner

*Primary Examiner* — David H Chu
(74) *Attorney, Agent, or Firm* — Brinks Gilson & Lione

(57) ABSTRACT

A complex curved primitive is decomposed into curvy RHTs comprising a curved portion and horizontal and vertical lines. Pixel rows covered by curvy RHTs are determined. RHT pixels covered by the curved primitive are determined with counters. Tile based color rendering is performed for covered pixels. The primitive path is decomposed into Bezier curves. Curvy RHTs may overlap and may cover pixels that are not covered by the curved primitive. Pixel rows are located by traversing an RHT path and the direction of traversing may determine pixel counts. Pixel coverage and tile coverage information is stored in memory. Pixels may be rendered in parallel. The curved primitive is rendered in a tile binning phase and a tile rendering phase. Tile rendering comprises a pixel coverage first pass which determines pixels covered by said curved primitive and a color rendering second pass.

20 Claims, 11 Drawing Sheets

METHOD AND SYSTEM FOR DECOMPOSING COMPLEX SHAPES INTO CURVY RHTS FOR RASTERIZATION

CROSS-REFERENCE TO RELATED APPLICATIONS/INCORPORATION BY REFERENCE

This application makes reference to, claims priority to, and claims the benefit of U.S. Provisional Application Ser. No. 61/328,541, filed Apr. 27, 2010, which is incorporated herein by reference in its entirety.

This application also makes reference to:
U.S. patent application Ser. No. 12/686,800, which was filed on Jan. 13, 2010,
U.S. patent application Ser. No. 12/953,128 which was filed on Nov. 23, 2010;
U.S. patent application Ser. No. 12/868,192, which was filed on Aug. 25, 2010,
U.S. patent application Ser. No. 12/942,626, which was filed on Nov. 9, 2010;
U.S. patent application Ser. No. 12/953,756, which was filed on Nov. 11, 2010;
U.S. patent application Ser. No. 12/869,900, which was filed on Aug. 27, 2010,
U.S. patent application Ser. No. 12/868,508, which was filed on Aug. 25, 2010; and
U.S. patent application Ser. No. 12/835,522, which was filed on Apr. 22, 2010.

Each of the above stated applications is hereby incorporated herein by reference in its entirety.

FIELD OF THE INVENTION

Certain embodiments of the invention relate to communication systems. More specifically, certain embodiments of the invention relate to decomposing complex shapes into curvy RHTs for rasterization.

BACKGROUND OF THE INVENTION

Digital video capabilities may be incorporated into a wide range of devices such as, for example, cellular phones, digital televisions, digital direct broadcast systems, digital recording devices, digital cameras, gaming consoles and the like. Digital video devices may provide significant improvements over conventional analog video systems in processing and transmitting video sequences with increased bandwidth efficiency.

Cellular phones with built-in cameras, or camera phones, have become prevalent in the mobile phone market, due to the low cost of CMOS image sensors and the ever increasing customer demand for more advanced cellular phones. As camera phones have become more widespread, their usefulness has been demonstrated in many applications, such as casual photography, but have also been utilized in more serious applications such as crime prevention, recording crimes as they occur, and news reporting.

Historically, the resolution of camera phones has been limited in comparison to typical digital cameras, due to the fact that they must be integrated into the small package of a cellular handset, limiting both the image sensor and lens size. In addition, because of the stringent power requirements of cellular handsets, large image sensors with advanced processing have been difficult to incorporate. However, due to advancements in image sensors, multimedia processors, and lens technology, the resolution of camera phones has steadily improved rivaling that of many digital cameras.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for decomposing complex shapes into curvy RHTs for rasterization, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for decomposing complex shapes into curvy RHTs for rasterization. A curved primitive that comprises a closed 2D complex shape, may be decomposed into a plurality of curvy right horizontal trapezium (RHT) primitives. A curvy RHT primitive may be referred to as a curvy RHT. Pixel rows that may be covered by each of the plurality of curvy RHT primitives may be determined. For each curvy RHT primitive, pixel counters for each pixel covered by each of the plurality of curvy RHT primitives may be incremented or decremented. Pixels which are covered by the curved primitive may be determined based on the pixel counters. Tile based color rendering of the curved primitive may be performed for the pixels that are determined to be covered by the curved primitive.

The curved primitive may comprise a curved exterior boundary that may be decomposed into a plurality of joined Bezier curves and/or curve segments. The joined Bezier curves or curve segments may be single valued in x for each y coordinate. The plurality of curvy RHT primitives may each comprise a curved portion that may comprise one or more of the Bezier curves and/or one or more of the curve segments, one or two horizontal lines connected to the curved portion and a vertical line that may intersect the curved primitive. One or more of the plurality of curvy RHT primitives may overlap at least a portion of one or more other of the plurality of curvy RHT primitives. A portion of one or more of the plurality of curvy RHT primitives may cover one or more pixels that are not covered by the curved primitive.

The pixel rows within each of the plurality of curvy RHT primitives may be located by traversing a path along a curved portion of each of the curvy RHT primitives. The choice of incrementing or the decrementing of pixel counters may be determined utilizing a direction of traversing a path along a curved portion of the curvy RHT primitive.

Information that identifies the pixels which are determined to be covered by the curved primitive may be stored in memory. Determination of which of the plurality of curvy RHT primitives and/or the curved primitive may overlap which of a plurality of tiles in a tiled view space may be performed. Information that identifies which of the plurality of curvy RHT primitives that overlaps which of the plurality of tiles in the tiled view space may be stored in memory. The tile based graphics rendering of the curved primitive may be performed for a plurality of pixels in parallel. The curved primitive may be rendered in two phases comprising a tile binning phase and a tile rendering phase. The tile rendering phase comprises a first pass which determines pixels covered by said curved primitive and a second pass which color renders said determined covered pixels. In this manner curvy RHT primitives may be utilized for rasterizing and/or rendering complex shapes.

Figure 1A:
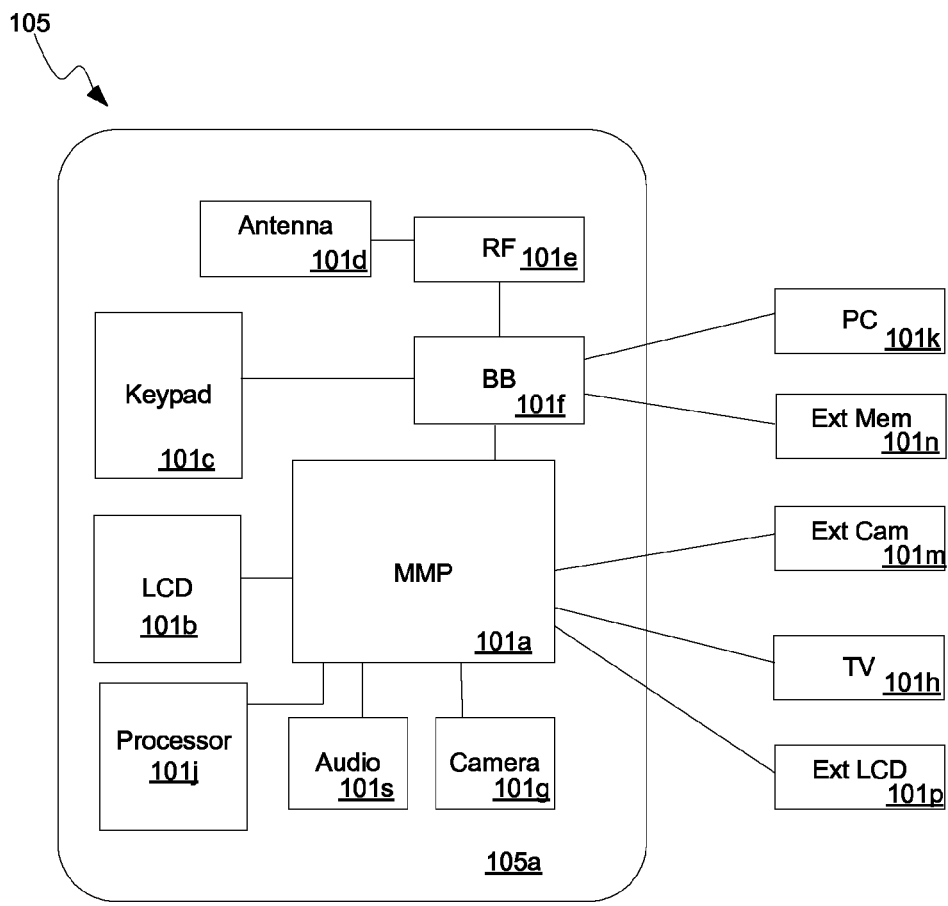
FIG. 1A is a block diagram of an exemplary multimedia system that is operable to render graphics that comprise primitives with complex curved shapes, in accordance with an embodiment of the invention.

FIG. 1A is a block diagram of an exemplary multimedia system that is operable to render graphics that comprise primitives with complex curved shapes, in accordance with an embodiment of the invention. Referring to FIG. 1A, there is shown a mobile multimedia system 105 that comprises a mobile multimedia device 105a, a TV 101h, a PC 101k, an external camera 101m, external memory 101n, and external LCD display 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD display 101b, a keypad 101c, and a camera 101g.

The MMP 101a may comprise suitable circuitry, logic, interfaces, and/or code that may be operable to perform video and/or multimedia processing for the mobile multimedia device 105a. The MMP 101a may also comprise integrated interfaces, which may be utilized to support one or more external devices coupled to the mobile multimedia device 105a. For example, the MMP 101a may support connections to a TV 101h, an external camera 101m, and an external LCD display 101p. The MMP 101a may be operable to perform fragment shading of a plurality of pixel fragment batches in parallel and may write results to a local tile buffer. For example, the MMP 101a may perform fragment shading and may write fragment color values to the buffer.

The processor 101J may comprise suitable circuitry, logic, interfaces, and/or code that may be operable to control processes in the mobile multimedia system 105. Although not shown in FIG. 1A, the processor 101J may be coupled to a plurality of devices in and/or coupled to the mobile multimedia system 105.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video data may be received from the external camera 101m, and image data may be received via the integrated camera 101g. During processing, the MMP 101a may utilize the external memory 101n for storing of processed data. Processed audio data may be communicated to the audio block 101s and processed video data may be communicated to the LCD 101b and/or the external LCD 101p, for example. The keypad 101c may be utilized for communicating processing commands and/or other data, which may be required for audio or video data processing by the MMP 101a.

In an embodiment of the invention, the MMP 101A may be operable to process video signals received wirelessly or generated by an imaging sensor, such as the external camera 101m or the camera 101g, for example. The MMP 101a may process video signals within a plurality of video modules, as described further with respect to FIG. 1B.

In an embodiment of the invention, the processor 101J may be operable to configure a virtual machine (VM) layer within an operating system, such as a Java or Microsoft common language runtime (CLR) environment. In addition, the processor 101J may support a native user layer comprising application and library domains, which may interact with the VM layer. The native user layer may communicate with hardware within the processor 101j and the MMP 101a via a kernel remote procedure call (RPC) within the processor 101j operating system.

In general, the user layer may also comprise implementations of various other standard and third-party APIs such as the Java MIDP (mobile information device profile). An application programming interface (API) such as open graphics library (GL) 3D may be utilized for video processing in the MMP 101a, and accessed by the user domain.

Communication between the VM layer and hardware via the kernel RPC may be costly in terms of latency, time, and power, for example. In an embodiment of the invention, commands to be communicated from the VM layer to hardware, such as the MMP 101*a*, may be buffered in a merge buffer in the VM layer, such that commands may be communicated out of the buffer when full, or at a desired level, such that more efficient use of the kernel RPC may be enabled. The merge buffer may comprise memory registers in the processor 101*j*, for example.

In an embodiment of the invention, the VM environment may comprise the client-side implementation of the graphics API, such as OpenVG and/or OpenGL ES, for example. For each function defined by the API specification, there may be a function with an appropriate name that may pack the function arguments into the merge buffer and optionally trigger transmission of the merge buffer to the native code and subsequently to the kernel and the video processor. For a small number of functions there may also be code that is operable to retrieve a return value from the video processor via the kernel and native code, or to store away parameter values which are only meaningful in the user layer, such as vertex attribute pointers for example, which may be used when processing future calls.

In an embodiment of the invention, the MMP 101A may be operable to perform tile mode rendering in two phases, a first phase comprising a tile binning process or operation and a second phase comprising a tile rendering process or operation. The MMP 101A may be operable to receive and processes graphics primitives comprising a curved boundary, for example, utilizing OpenVG. The MMP 101*a* may be operable to decompose the curved primitive boundary into a plurality of Bezier curves which may be utilized for rasterizing the primitive. The MMP 101*a* may be operable to process video signals within a plurality of video modules, as described further with respect to FIG. 1B.

Figure 1B:
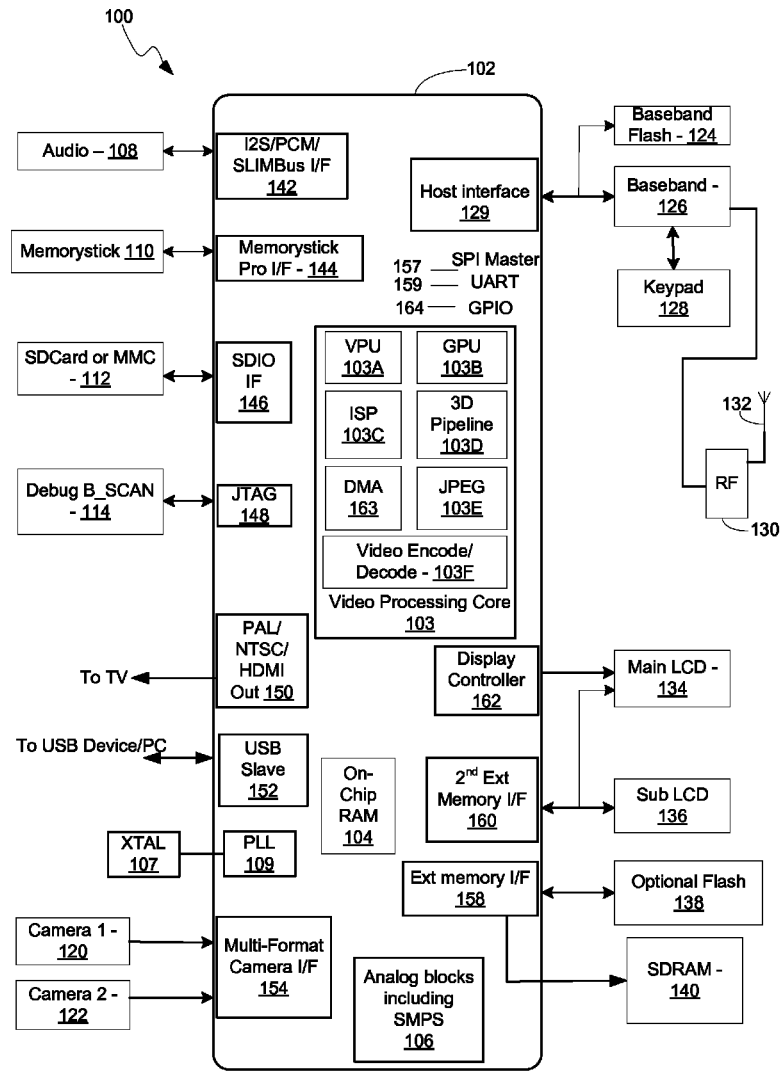
FIG. 1B is a block diagram of an exemplary multimedia device comprising a video core that is operable to render graphics comprising primitives with complex curved shapes, in accordance with an embodiment of the invention.

FIG. 1B is a block diagram of an exemplary multimedia device comprising a video core that is operable to render graphics comprising primitives with complex curved shapes, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a video processing unit (VPU) 103A, a graphic processing unit 103B, an image sensor pipeline (ISP) 103C, a 3D pipeline 103D, a direct memory access (DMA) controller 163, a joint photographic experts group (JPEG) encoding/decoding module 103E, and a video encoding/decoding module 103F. The mobile multimedia processor 102 may also comprise on-chip RAM 104, an analog block 106, a phase locked loop (PLL) 109, an audio interface (I/F) 142, a memory stick I/F 144, SD card I/F 146, JTAG I/F 148, TV output I/F 150, USB I/F 152, a camera I/F 154, and a host I/F 129. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The video processing core 103 may comprise suitable logic, circuitry, interfaces, and/or code that may be operable to perform video processing of data. The on-chip Random Access Memory (RAM) 104 and the Synchronous Dynamic RAM (SDRAM) 140 comprise suitable logic, circuitry and/or code that may be adapted to store data such as image or video data.

The image sensor pipeline (ISP) 103C may comprise suitable circuitry, logic and/or code that may be operable to process image data. The ISP 103C may perform a plurality of processing techniques comprising filtering, demosaic, lens shading correction, defective pixel correction, white balance, image compensation, Bayer interpolation, color transformation, and post filtering, for example. The processing of image data may be performed on variable sized tiles, reducing the memory requirements of the ISP 103C processes.

The GPU 103B may comprise suitable logic, circuitry, interfaces, and/or code that may be operable to offload graphics rendering from a general processor, such as the processor 101*j*, described with respect to FIG. 1A. The GPU 103B may be operable to perform mathematical operations specific to graphics processing, such as texture mapping and rendering polygons, for example.

The 3D pipeline 103D may comprise suitable circuitry, logic and/or code that may enable the rendering of 2D and 3D graphics. The 3D pipeline 103D may perform a plurality of processing techniques comprising vertex processing, rasterizing, early-Z culling, interpolation, texture lookups, pixel shading, depth test, stencil operations and color blend, for example.

The JPEG module 103E may comprise suitable logic, circuitry, interfaces, and/or code that may be operable to encode and/or decode JPEG images. JPEG processing may enable compressed storage of images without significant reduction in quality.

The video encoding/decoding module 103F may comprise suitable logic, circuitry, interfaces, and/or code that may be operable to encode and/or decode images, such as generating full 108p HD video from H.264 compressed data, for example. In addition, the video encoding/decoding module 103F may be operable to generate standard definition (SD) output signals, such as phase alternating line (PAL) and/or national television system committee (NTSC) formats.

The analog block 106 may comprise a switch mode power supply (SMPS) block and an on-chip SMPS controller, which may be adapted to generate its core voltage. The core voltage may be software programmable according to, for example, speed demands on the mobile multimedia processor 102, allowing further control of power management.

The PLL 109 may comprise suitable logic, circuitry, interfaces, and/or code that may be operable to generate suitable clock signals, 195 kHz-200 MHz clocks, for example, for external devices. A crystal, the XTAL 107, may be coupled to the PLL 109 and may comprise suitable logic, circuitry, interfaces, and/or code that may be operable to generate a stable oscillating signal for the PLL 109. Other voltages and clock speeds may be utilized depending on the type of application. The mobile multimedia processor 102 may comprise a plurality of power modes of operation, for example, run, sleep, hibernate and power down.

The audio block 108 may comprise suitable logic, circuitry, interfaces, and/or code that may be operable to communicate with the mobile multimedia processor 102 via an inter-IC sound ($I^2S$), pulse code modulation (PCM), serial low-power inter-chip media bus (SLIMBus), audio codec (AC'97) interface 142 or other suitable interface, for example. In the case of an AC'97 and/or an $I^2S$ interface, suitable audio controller, processor and/or circuitry may be operable to provide AC'97 and/or $I^2S$ audio output respectively, in either master or slave mode. In the case of the PCM interface, a suitable audio controller, processor and/or circuitry may be operable to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1B).

The mobile multimedia device 100 may comprise at least one portable memory input/output (I/O) block. In this regard, the memorystick block 110 may comprise suitable logic, circuitry, interfaces, and/or code that may be operable to communicate with the mobile multimedia processor 102 via a memorystick pro interface 144, for example. The SD card block 112 may comprise suitable logic, circuitry, interfaces, and/or code that may be operable to communicate with the mobile multimedia processor 102 via a SD input/output (I/O) interface 146, for example. A multimedia card (MMC) may also be utilized to communicate with the mobile multimedia processor 102 via the SD input/output (I/O) interface 146, for example. The mobile multimedia device 100 may comprise other portable memory I/O blocks such an xD I/O card.

The debug block 114 may comprise suitable logic, circuitry, interfaces, and/or code that may be operable to communicate with the mobile multimedia processor 102 via a joint test action group (JTAG) interface 148, for example. The debug block 114 may be adapted to access the address space of the mobile multimedia processor 102 and may be adapted to perform boundary scan via an emulation interface. Other test access ports (TAPs) may be utilized. The phase alternate line (PAL)/national television standards committee (NTSC)/high definition multimedia interface (HDMI) TV output I/F 150 may be utilized for communication with a TV, and the universal serial bus (USB) 1.1, or other variant thereof, slave port I/F 152 may be utilized for communications with a PC, for example. The cameras 120 and/or 122 may comprise suitable logic, circuitry, interfaces, and/or code that may be operable to generate images and/or HD video and communicate with the mobile multimedia processor 102 via a multi-format raw/CCIR 601 camera interface 154, for example. The camera I/F 154 may also be used, for example, to connect the mobile multimedia processor 102 to a mobile TV front end.

The mobile multimedia processor 102 may also comprise a plurality of serial interfaces, such as the USB I/F 152, a serial peripheral interface (SPI) 157, and a universal asynchronous receiver/transmitter (UART) I/F 159 for Bluetooth or IrDA. The SPI master interface 157 may comprise suitable circuitry, logic, and/or code and may be utilized to control image sensors. Two chip selects may be provided, for example, and the interface may work in a polled mode with interrupts or via a DMA controller 163. In another embodiment of the invention, the interface may comprise an 120 serial interface, which may be used for camera control, for example. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, and/or code and may be adapted to support multiple displays with VGA, XGA, or HD resolution, for example, and to handle 8/9/16/18/24-bit video data.

The mobile multimedia processor 102 may be connected via an 8/16 bit parallel host interface 129 to the same bus as the baseband processing block 126 uses to access the baseband flash memory 124. The host interface 129 may be operable to provide two channels with independent address and data registers through which a host processor may read and/or write directly to the memory space of the mobile multimedia processor 102. The baseband processing block 126 may comprise suitable logic, circuitry, interfaces, and/or code that may be operable to convert RF signals to baseband and communicate the baseband processed signals to the mobile multimedia processor 102 via the host interface 129, for example. The RF processing block 130 may comprise suitable logic, circuitry, interfaces, and/or code that may be operable to receive signals via the antenna 132 and to communicate RF or IF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry and/or code and may be adapted to drive an internal TV out function or be connected to a range of LCD's. The display controller 162 may be adapted to support a range of screen buffer formats and may utilize direct memory access (DMA) to access the buffer directly and increase video processing efficiency of the video processing core 103. Both NTSC and PAL raster formats may be generated by the display controller 162 for driving the TV out. Other formats, for example SECAM, may also be supported.

The display controller 162 may recognize and communicate a display type to the DMA controller 163. In this regard, the DMA controller 163 may fetch video data in an interlaced or non-interlaced fashion for communication to an interlaced or non-interlaced display coupled to the mobile multimedia processor 102 via the display controller 162.

The subsidiary LCD 136 may comprise suitable logic, circuitry and/or code that may be adapted to communicate with the mobile multimedia processor 102 via a second external memory interface 160, for example. The subsidiary LCD 136 may be used on a clamshell phone where the main LCD 134 may be inside and the subsidiary LCD 136 may be outside, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry, interfaces, and/or code that may be operable to communicate with the mobile multimedia processor 102 via an external memory interface 158, for example. The SDRAM 140 may comprise suitable logic, circuitry and/or code that may be adapted to receive data from the mobile multimedia processor 102 via the external memory interface 158, for example. The external memory I/F 158 may be utilized by the mobile multimedia processor 102 to connect to the SDRAM 140, SRAM, Flash memory 138, and/or external peripherals, for example. Control and timing information for the SDRAM 140 and other asynchronous devices may be configurable by the mobile multimedia processor 102.

The mobile multimedia processor 102 may further comprise a secondary external memory interface 160 to connect to memory-mapped LCD and external peripherals, for example. The secondary external memory interface 160 may comprise suitable circuitry, logic, and/or code and may be utilized to connect the mobile multimedia processor 102 to slower devices without compromising the speed of external memory access. The secondary external memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example. The mobile multimedia processor 102 may be operable to store data in a merge buffer in a virtual machine environment, and enable the interaction/operation with the various functional layers, such as the virtual machine user layer, a native user layer, and kernel.

In operation, the 3D pipeline 103D may be operable to perform tile mode graphics rendering of two dimensional graphics primitives that may comprise a curved shape boundary. The tile based graphics rendering may comprise a tile binning phase and a tile rendering phase. A tile may be referred to as a bin. The tile rendering phase may comprise two passes. A first pass may generate per-pixel coverage data for a specified primitive, for example, coverage counts. A second pass may color render pixels that that have non-zero coverage counts for the specified primitive.

Figure 4:
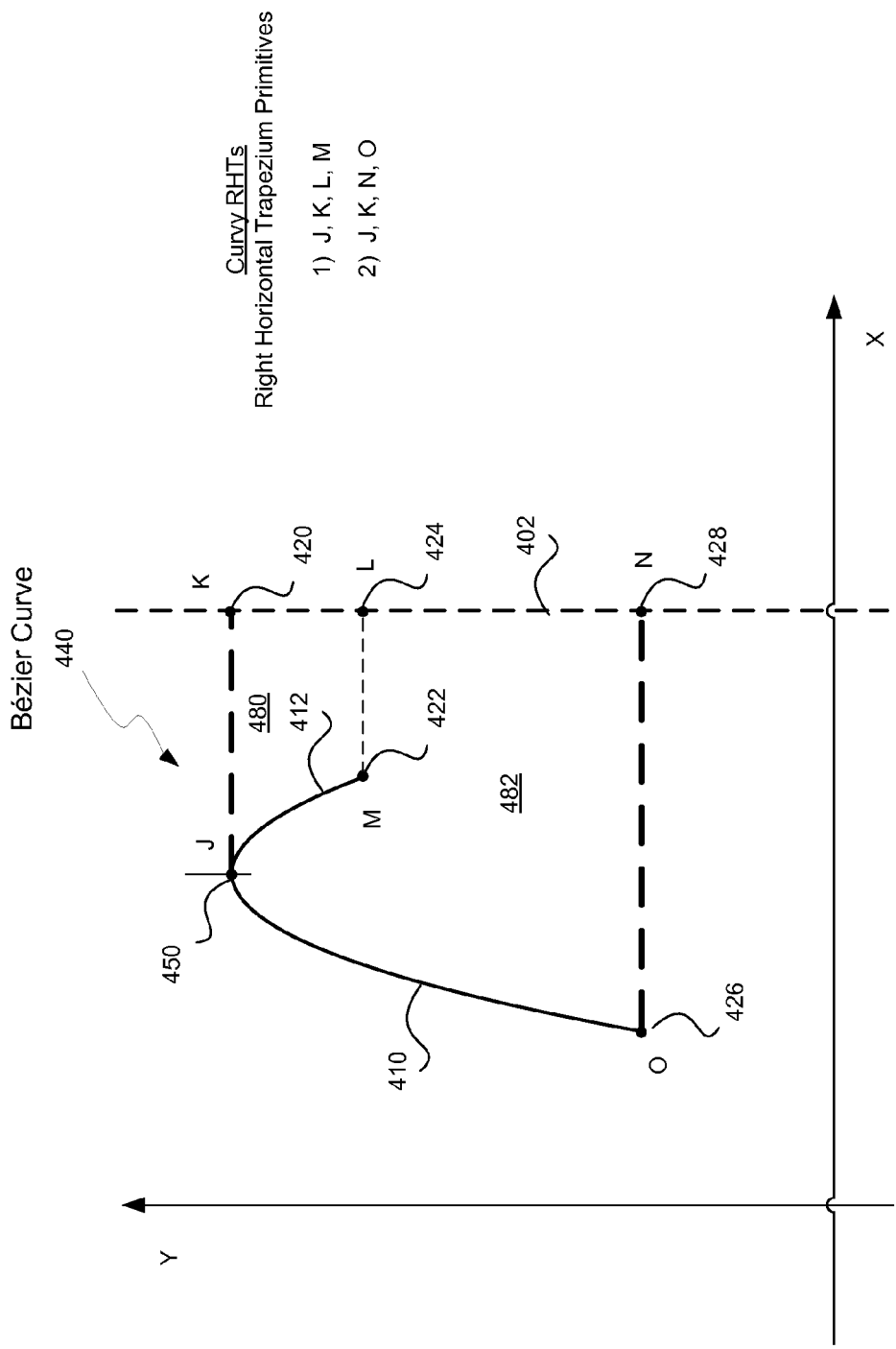
FIG. 4 is a diagram that illustrates exemplary curvy RHTs each of which comprise a Bezier curve or a curve segment that is single valued in x for each corresponding y coordinate, which may be utilized in accordance with an embodiment of the invention.

The 3D pipeline 103D may be operable to decompose a curved boundary of a graphics primitive into a plurality of Bezier curves. The 3D pipeline 103D may determine whether each of the Bezier curves are single valued in x for each y coordinate. In instances when a Bezier curve is not single valued in x, the 3D pipeline 103D may divide the Bezier curve into curve segments that are single valued in x. For example, the Bezier curves may be divided into segments at maxima or minima in y. The Bezier curves or curve segments that are single valued in x may be utilized to form curvy RHTs. For example, the 3D pipeline 103D may be operable to decompose a two dimensional, graphics primitive that comprises a curved shape boundary into a plurality of primitive shapes where each of the plurality of primitive shapes may be bounded on one side by a Bezier curve or a curve segment, that is single valued in x for each y coordinate. The plurality of decomposed primitive shapes may be referred to as curvy RHTs and may be utilized for rasterization. The FIG. 4 shows a representation of two overlapping curvy RHTs.

During the tile binning phase of closed curved input primitives, the 3D pipeline may be operable to transform the curved primitives into a view or screen space that comprises an x, y coordinate system, for example. The view space may be tiled such that one or more curved graphics primitives and/or portions of the curved graphics primitives may overlap one or more tiles in the view space. Once the curved primitives are decomposed into curvy RHTs, tile binning for the RHTs may be performed. The invention is not limited to any specific tile binning method and any suitable method may be utilized. In an exemplary embodiment of the invention, a bounding rectangle may be determined for each curvy RHT. For example, software that may decompose a closed curved primitive into a plurality of curvy RHTs and may also determine a bounding rectangle about each curvy RHT. During the tile binning phase a tile list may be generated for each tile comprising at least a portion of a curved primitive. Each tile list may comprise a list of all of the curvy RHTs that overlap a corresponding tile, grouped by curved input primitive.

During the tile rendering phase, at least a portion of the tile binning steps may be repeated. Once tile lists are generated, for each tile and/or for each corresponding tile list and for each curvy input primitive which comprises at least one curvy RHT in the corresponding tile list, each such curvy input primitive may be rendered in two passes. The first pass of tile rendering for each curvy RHT may generate per-pixel coverage data. For example, the coverage data may comprise per pixel coverage counters. In this regard, the 3D pipeline may be operable to determine where a curved primitive boundary intersects a row of horizontal pixels by traversing a path through the Bezier curves and curve segments of the curved boundary. In instances when the 3D pipeline 103D finds a horizontal row of pixels that intersects the curved primitive boundary, the 3D pipeline 103D may determine whether some pixels on that row fall within the primitive or are outside of the primitive, utilizing pixel counters, for example. The coverage data may be stored in a tile coverage buffer (shown in FIG. 8B).

The second pass of tile rendering may comprise color rendering of the pixels that have non-zero coverage counts. Output from the second pass may be stored to a tile color buffer (shown in FIG. 8B). In various embodiments of the invention, as the color buffer is written to, the coverage buffer may be cleared in preparation for rendering the next input primitive. The second pass may traverse all of the pixels in a bounding rectangle of the curvy input primitive. In this regard, a rectangular primitive may be entered into a pipeline (shown in FIG. 8B) after the curvy RHTs of the curvy input primitive.

Batches of pixel data may be processed in parallel in the 3D pipeline 103D. The 3D pipeline 103D may generate batches of pixel data by rasterizing geometric primitives from the tile lists, and may perform pixel shading for a plurality of pixel batches in parallel. The shaded batches of pixel data may be written to a buffer in the 3D pipeline 103D, in a specified order. Once the batches of data are fully shaded, the shaded pixels may be stored in main memory, for example, the RAM 104 or in off chip memory, for example, SDRAM 140.

Figure 2:
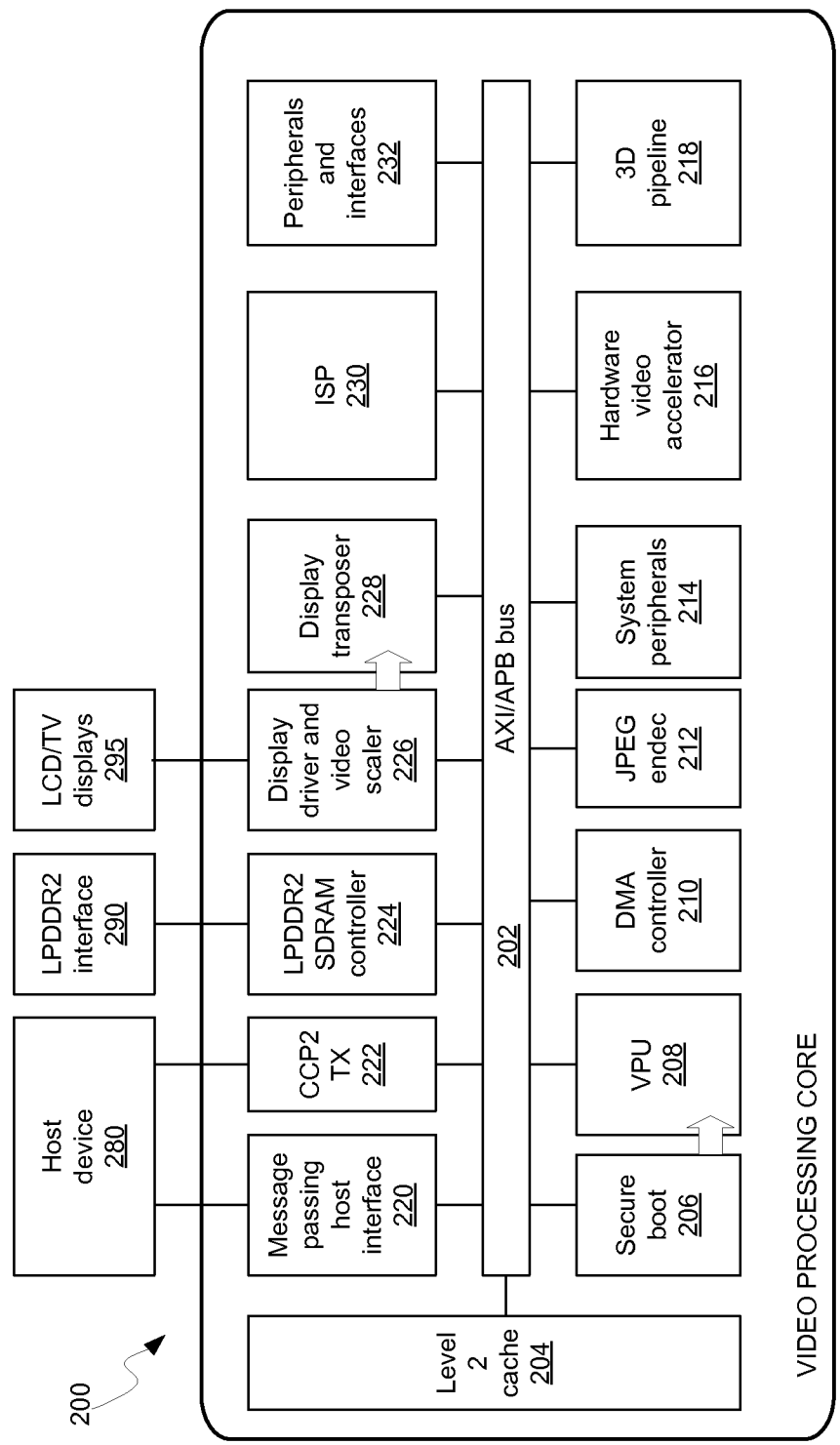
FIG. 2 is a block diagram that illustrates an exemplary video processing core architecture that is operable to decompose complex shapes into curvy RHTs for rasterization, in accordance with an embodiment of the invention.

FIG. 2 is a block diagram that illustrates an exemplary video processing core architecture that is operable to decompose complex shapes into curvy RHTs for rasterization, in accordance with an embodiment of the invention. Referring to FIG. 2, there is shown a video processing core 200 comprising suitable logic, circuitry, interfaces and/or code that may be operable for high performance video and multimedia processing. The architecture of the video processing core 200 may provide a flexible, low power, and high performance multimedia solution for a wide range of applications, including mobile applications, for example. By using dedicated hardware pipelines in the architecture of the video processing core 200, such low power consumption and high performance goals may be achieved. The video processing core 200 may correspond to, for example, the video processing core 103 described above with respect to FIG. 1B.

The video processing core 200 may support multiple capabilities, including image sensor processing, high rate (e.g., 30 frames-per-second) high definition (e.g., 1080p) video encoding and decoding, three-dimensional (3D) graphics, high speed Joint Photographic Experts Group (JPEG) encode and decode, audio codecs, image scaling, and/or liquid crystal display (LCD) and television (TV) outputs, for example.

In one embodiment, the video processing core 200 may comprise an Advanced eXtensible Interface/Advanced Peripheral (AXI/APB) bus 202, a level 2 cache 204, a secure boot 206, a Vector Processing Unit (VPU) 208, a direct memory access (DMA) controller 210, a JPEG encoder/decoder (endec) 212, a systems peripherals 214, a message passing host interface 220, a Compact Camera Port 2 (CCP2) transmitter (TX) 222, a Low-Power Double-Data-Rate 2 Synchronous Dynamic Random Access Memory (LPDDR2 SDRAM) controller 224, a display driver and video scaler 226, and a display transposer 228. The video processing core 200 may also comprise an image sensor pipeline (ISP) 230, a hardware video accelerator 216, a 3D pipeline 218, and peripherals and interfaces 232. In other embodiments of the video processing core 200, however, fewer or more components than those described above may be included.

In one embodiment, the VPU 208, the ISP 230, the 3D pipeline 218, the JPEG endec 212, the DMA controller 210, and/or the hardware video accelerator 216, may correspond to the VPU 103A, the ISP 103C, the 3D pipeline 103D, the JPEG 103E, the DMA 163, and/or the video encode/decode 103F described above with respect to FIG. 1B.

Coupled to the video processing core 200 may be a host device 280, an LPDDR2 interface 290, and/or LCD/TV displays 295. The host device 280 may comprise a processor, such as a microprocessor or Central Processing Unit (CPU), microcontroller, Digital Signal Processor (DSP), or other like processor, for example. In some embodiments, the host device 280 may correspond to the processor 101j described above with respect to FIG. 1A. The LPDDR2 interface 290 may comprise suitable logic, circuitry, and/or code that may be operable to allow communication between the LPDDR2 SDRAM controller 224 and memory. The LCD/TV displays 295 may comprise one or more displays (e.g., panels, monitors, screens, cathode-ray tubes (CRTs)) for displaying image and/or video information. In some embodiments, the LCD/TV displays 295 may correspond to one or more of the TV 101h and the external LCD 101p described above with respect to FIG. 1A, and the main LCD 134 and the sub LCD 136 described above with respect to FIG. 1B.

The message passing host interface 220 and the CCP2 TX 222 may comprise suitable logic, circuitry, and/or code that may be operable to allow data and/or instructions to be communicated between the host device 280 and one or more components in the video processing core 200. The data communicated may include image and/or video data, for example.

The LPDDR2 SDRAM controller 224 and the DMA controller 210 may comprise suitable logic, circuitry, and/or code that may be operable to control accessing memory by one or more components and/or processing blocks in the video processing core 200.

The VPU 208 may comprise suitable logic, circuitry, and/or code that may be operable for data processing while maintaining high throughput and low power consumption. The VPU 208 may allow flexibility in the video processing core 200 such that software routines, for example, may be inserted into the processing pipeline. The VPU 208 may comprise dual scalar cores and a vector core, for example. The dual scalar cores may use a Reduced Instruction Set Computer (RISC)-style scalar instruction set and the vector core may use a vector instruction set, for example. Scalar and vector instructions may be executed in parallel.

Although not shown in FIG. 2, the VPU 208 may comprise one or more Arithmetic Logic Units (ALUs), a scalar data bus, a scalar register file, one or more Pixel-Processing Units (PPUs) for vector operations, a vector data bus, a vector register file, a Scalar Result Unit (SRU) that may operate on one or more PPU outputs to generate a value that may be provided to a scalar core. Moreover, the VPU 208 may comprise its own independent level 1 instruction and data cache.

The ISP 230 may comprise suitable logic, circuitry, and/or code that may be operable to provide hardware accelerated processing of data received from an image sensor (e.g., charge-coupled device (CCD) sensor, complimentary metal-oxide semiconductor (CMOS) sensor). The ISP 230 may comprise multiple sensor processing stages in hardware, including demosaicing, geometric distortion correction, color conversion, denoising, and/or sharpening, for example. The ISP 230 may comprise a programmable pipeline structure. Because of the close operation that may occur between the VPU 208 and the ISP 230, software algorithms may be inserted into the pipeline.

The hardware video accelerator 216 may comprise suitable logic, circuitry, and/or code that may be operable for hardware accelerated processing of video data in any one of multiple video formats such as H.264, Windows Media 8/9/10 (VC-1), MPEG-1, MPEG-2, and MPEG-4, for example. For H.264, for example, the hardware video accelerator 216 may encode at full high-definition (HD) 1080p at 30 fps. For MPEG-4, for example, the hardware video acceleration 216 may encode a HD 720p at 30 fps. For H.264, VC-1, MPEG-1, MPEG-2, and MPEG-4, for example, the hardware video accelerator 216 may decode at full HD 1080p at 30 fps or better. The hardware video accelerator 216 may be operable to provide concurrent encoding and decoding for video conferencing and/or to provide concurrent decoding of two video streams for picture-in-picture applications, for example.

The 3D pipeline 218 may comprise suitable logic, circuitry, and/or code that may be operable to provide 3D rendering operations for use in, for example, graphics applications. The 3D pipeline 218 may support OpenVG 1.1 and may support other APIs such as OpenGL-ES 2.0, OpenGL-ES 1.1, for example. The 3D pipeline 218 may comprise a multi-core programmable pixel shader, for example. The 3D pipeline 218 may be operable to handle 2D graphics and/or 3D graphics.

In various embodiments of the invention, the 3D pipeline 218 may comprise suitable logic, circuitry, interfaces and/or code that may be operable to control 3D pipeline 218 operations utilizing one or more control lists. For example, the control lists may define operations and may comprise curvy RHT primitive data for graphics rendering of the curved primitives. The graphics rendering my comprise a tile binning phase and a tile rendering phase which may comprise color shading and/or pixel rendering, for example. The control lists may be generated by a host processor outside of the 3D pipeline 218 and may be read into the 3D pipeline 218. The control lists may drive hardware within the 3D pipeline 218 in order to automate control of 3D pipeline 218 operations. The control lists may define all or a large portion of the operations of the 3D pipeline 218 such that little or no interaction by a host processor may be needed after the 3D pipeline 218 begins executing based on the control lists.

The JPEG endec 212 may comprise suitable logic, circuitry, and/or code that may be operable to provide processing (e.g., encoding, decoding) of images. The encoding and decoding operations need not operate at the same rate. For example, the encoding may operate at 120M pixels-per-second and the decoding may operate at 50M pixels-per-second depending on the image compression.

The display driver and video scaler 226 may comprise suitable logic, circuitry, and/or code that may be operable to drive the TV and/or LCD displays in the TV/LCD displays 295. In this regard, the display driver and video scaler 226 may output to the TV and LCD displays concurrently and in real time, for example. Moreover, the display driver and video scaler 226 may comprise suitable logic, circuitry, and/or code that may be operable to scale, transform, and/or compose multiple images. The display driver and video scaler 226 may support displays of up to full HD 1080p at 60 fps.

The display transposer 228 may comprise suitable logic, circuitry, and/or code that may be operable for transposing output frames from the display driver and video scaler 226. The display transposer 228 may be operable to convert video to 3D texture format and/or to write back to memory to allow processed images to be stored and saved.

The secure boot 206 may comprise suitable logic, circuitry, and/or code that may be operable to provide security and Digital Rights Management (DRM) support. The secure boot 206 may comprise a boot Read Only Memory (ROM)) that may be used to provide secure root of trust. The secure boot 206 may comprise a secure random or pseudo-random number generator and/or secure (One-Time Password) OTP key or other secure key storage.

The AXI/APB bus 202 may comprise suitable logic, circuitry, and/or interface that may be operable to provide data and/or signal transfer between various components of the video processing core 200. In the example shown in FIG. 2, the AXI/APB bus 202 may be operable to provide communication between one or more of the components the video processing core 200.

The AXI/APB bus 202 may comprise one or more buses. For example, the AXI/APB bus 202 may comprise one or more AXI-based buses and/or one or more APB-based buses. The AXI-based buses may be operable for cached and/or uncached transfer, and/or for fast peripheral transfer. The APB-based buses may be operable for slow peripheral transfer, for example. The transfer associated with the AXI/APB bus 202 may be of data and/or instructions, for example.

The AXI/APB bus 202 may provide a high performance system interconnection that allows the VPU 208 and other components of the video processing core 200 to communicate efficiently with each other and with external memory.

The level 2 cache 204 may comprise suitable logic, circuitry, and/or code that may be operable to provide caching operations in the video processing core 200. The level 2 cache 204 may be operable to support caching operations for one or more of the components of the video processing core 200. The level 2 cache 204 may complement level 1 cache and/or local memories in any one of the components of the video processing core 200. For example, when the VPU 208 comprises its own level 1 cache, the level 2 cache 204 may be used as complement. The level 2 cache 204 may comprise one or more blocks of memory. In one embodiment, the level 2 cache 204 may be a 128 kilobyte four-way set associate cache comprising four blocks of memory (e.g., Static Random Access Memory (SRAM)) of 32 kilobytes each.

The system peripherals 214 may comprise suitable logic, circuitry, and/or code that may be operable to support applications such as, for example, audio, image, and/or video applications. In one embodiment, the system peripherals 214 may be operable to generate a random or pseudo-random number, for example. The capabilities and/or operations provided by the peripherals and interfaces 232 may be device or application specific.

In operation, the video processing core 200 may be operable to carry out a plurality of multimedia tasks simultaneously without degrading individual function performance. The video processing core 200 may be operable to render 2D and/or 3D graphics primitives. For example, the video processing core 200 may be operable to receive and render primitives comprising closed 2D complex shapes with curved boundaries. The video processing core 200 may be operable to decompose a curved primitive boundary into a plurality of Bezier curves, for example, cubic Bezier curves and may further divide the curves into curve segments at a minima and/or a maxima of the Bezier curve. The Bezier curves and/or curve segments may be single valued in x for each y coordinate. A curved boundary or perimeter of such a received primitive, which comprises a plurality of joined Bezier curves and/or curved segments may be referred to as a path.

The video processing core 200 may also be operable to decompose each received primitive into a plurality curvy RHT shapes in accordance with the decomposed path. The curvy RHTs are shown in FIG. 4. The video processing core 200 may be operable to determine a bounding rectangle for each curvy RHT to be utilized in tile binning. Portions of a curvy RHT may comprise pixels that are covered by a corresponding received primitive and portions of an RHT may be outside of the received primitive. The curvy RHTs may be utilized for rasterization.

The video processing core 200 may be operable to render the curvy RHTs in two phases comprising a tile binning phase and a tile rendering phase. The tile rendering phase may comprise two passes, a first pass to generate per-pixel coverage data, such as coverage counts, for a curvy primitive and a second pass to color render the pixels that have non-zero coverage counts for that primitive.

During the first phase, the video processing core may be operable to receive a closed 2D primitive comprising a curved boundary, decompose the boundary into a plurality of Bezier curves and/or curve segments that are single valued in x for each y, and generate a plurality of curvy RHT shapes accordingly. The video processing core 200 may be operable to determine a bounding rectangle for each curvy RHT that may be utilized for tile binning the curvy RHTs. The video processing core 200 may be operable to tile bin all of the curvy RHTs of all of the input primitives and may output tile lists. Each tile list may correspond to a bin or a tile and may comprise a list of all the curvy RHTs that overlap the corresponding tile, grouped by each received primitive.

In various embodiments of the invention, a portion of the tile mode binning may be repeated during the tile rendering phase. During the first pass of the tile rendering phase, for each tile, the video processing core 200 may determine which pixels in each curvy RHT are covered by a corresponding received primitive shape and which pixels are outside of the primitive shape. The coverage information may be stored in a tile coverage buffer for use during the second pass of tile mode rendering. During the second pass of tile mode rendering, for each tile in view space that comprises one or more curvy RHTs or a portion of a curvy RHT, the video core 200 may utilize the stored pixel coverage information to mask pixels. After all of the curvy RHTs that correspond to a received primitive are input to the pipeline 350, a bounding rectangle corresponding the received primitive may be input to the pipeline. All of the pixels which correspond to the bounding rectangle may be traversed. The curvy RHTs in each bounding rectangle may be color rendered only for pixels that are covered by the corresponding received primitive. The video core 200 may be operable to color render batches of pixel fragments in parallel.

In various embodiments of the invention, the video processing core 200 may also be operable to implement movie playback operations. In this regard, the video processing core 200 may be operable to add 2D and/or 3D effects to video output, for example, to map the video onto 2D and/or 3D surfaces or to mix 2D and/or 3D animation with the video. In another exemplary embodiment of the invention, the video processing core 200 may be utilized in a gaming device. The VPU 208 may be operable to execute a game engine and may supply graphics curved primitives to the 3D pipeline 218 to enable high quality self-hosted games. In another embodiment, the video processing core 200 may be utilized for stills capture. In this regard, the ISP 230 and/or the JPEG endec 212 may be utilized to capture and encode a still image. For stills viewing and/or editing, the JPEG endec 212 may be utilized to decode the stills data and the video scaler may be utilized for display formatting. Moreover, the 3D pipeline 218 may be utilized for 2D and/or 3D effects, for example, for warping an image or for page turning transitions in a slide show, for example.

Figure 3A:
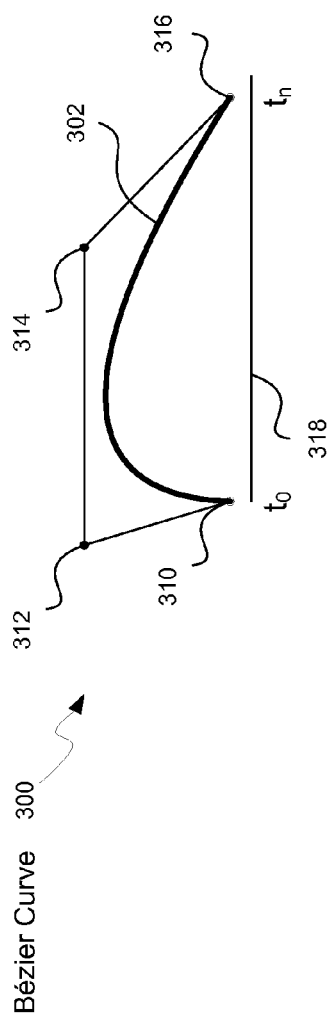
FIG. 3A is a diagram that illustrates an exemplary Bezier curve, which may be utilized in accordance with an embodiment of the invention.

FIG. 3A is a diagram that illustrates an exemplary Bezier curve, which may be utilized in accordance with an embodiment of the invention. Referring to FIG. 3A, there is shown a system for drawing a parametric Bezier curve 300 which comprises a plurality of control points 310, 312, 314 and 316, a line of parameters 318 and a Bezier curve 302.

The Bezier curve 302 may be determined utilizing the plurality of control points 310, 312, 314 and 316 and a line of parameters 318 that may comprise parameters $t_0$ through $t_n$. Numerical values for the plurality of parameters $t_0$ through $t_n$ may range from 0 and 1. The Bezier curve 302 may be generated utilizing a parametric function that may be solved for the parameters $t_0$ through $t_n$ along the line of parameters 318.

The Bezier curve 302 may be generated based on a polygon that may be defined by the control points 310, 312, 314 and 316, for example. The polygon may be referred to as a Bezier polygon. Three intermediate points may be determined for each of three upper sides of the Bezier polygon. The intermediate points may be varied between control points to control generation of the Bezier curve 302. The control points 310 and 316 may be referred to as base points 310 and 316. End points of the Bezier curve 302 may coincide with the base points 310 and 316. A parametric function that may be solved for each parameter value $t_0$ through $t_n$ along the line 318 between the base points 310 and 316, may define the path of the Bezier curve 302.

The Bezier curve 302 may be generated as the parameters $t_0$ through $t_n$ along the line of parameters 318 are varied between zero and one. As the parameters vary from zero through one, the three intermediate points may be varied along the upper three sides of the Bezier polygon between control points to guide the shape of the Bezier curve 302. The Bezier curve 302 shown in FIG. 3A may comprise a cubic Bezier curve, however, the invention is not limited with regard to any specific order or degree and a Bezier curve of any suitable order or degree may be utilized.

Figure 3C:
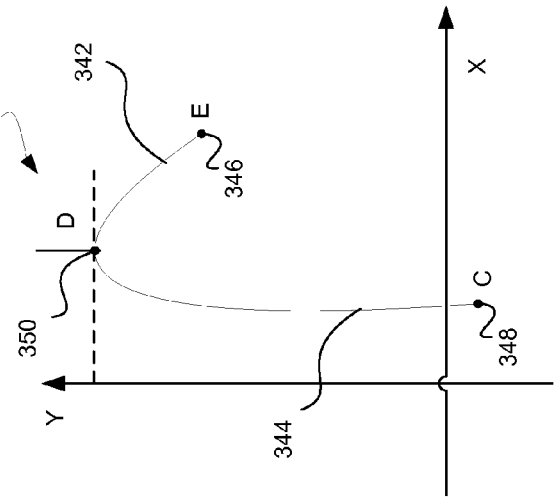
FIG. 3C is a diagram that illustrates an exemplary Bezier curve that is divide into segments where each segment is single valued in x for each corresponding y coordinate, which may be utilized in accordance with an embodiment of the invention.
Figure 3B:
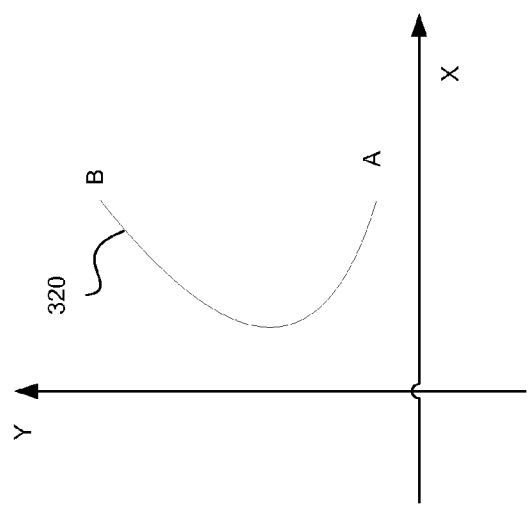
FIG. 3B is a diagram that illustrates an exemplary Bezier curve that is single valued in x for each corresponding value of y, which may be utilized in accordance with an embodiment of the invention.

FIG. 3B is a diagram that illustrates an exemplary Bezier curve that is single valued in x for each corresponding value of y, which may be utilized in accordance with an embodiment of the invention. Referring to FIG. 3B, there is shown a Bezier curve 320.

The Bezier curve 320 may be represented in an x, y coordinate system. The Bezier curve 320 may be oriented in the x, y coordinate system and may comprise a shape such that every point along the Bezier curve 320 may be defined at only one x coordinate for each corresponding y coordinate.

FIG. 3C is a diagram that illustrates an exemplary Bezier curve that is divide into segments where each segment is single valued in x for each corresponding y coordinate, which may be utilized in accordance with an embodiment of the invention. Referring to FIG. 3C, there is shown a Bezier curve 340 that comprises a maximum in y 350, two Bezier curve segments 342 and 344 and two endpoints 346 and 348.

The Bezier curve 340 may be represented in an x, y coordinate system and may span between the endpoints 346 and 348. The Bezier curve 340 may be oriented in the x, y coordinate system, and may comprise a shape, such that various portions of the Bezier curve 340 may be defined at more than one x coordinate for a single y coordinate. The Bezier curve 340 may be divided into portions which may be referred to as curve segments, for example, the Bezier curve 340 may be divided into the curve segments 342 and 344. The Bezier curve 340 may be divided at a maxima or at a minima in y such that each one of the curve segments 342 and 344 may be single valued in x for each y coordinate. For example, the Bezier curve 340 may be divided at the maximum in y 350. In this regard, a path between the endpoints 346 and 348 may comprise two curve segments 342 and 344 that are each single valued in x for each y coordinate.

In operation, the mobile multimedia system 105, the mobile multimedia processor 102 and/or the video processing core 200 may comprise suitable logic, circuitry, interfaces and/or code that may be operable to receive and/or generate a 2D primitive comprising a closed shape with a curved boundary and may be operable to decompose the curved boundary into a path comprising plurality of Bezier curves and curve segments. The plurality of Bezier curves and/or curve segments may each be single valued in x for each y coordinate.

FIG. 4 is a diagram that illustrates exemplary curvy RHTs, each of which comprise a Bezier curve or a curve segment that is single valued in x for each corresponding y coordinate, in accordance with an embodiment of the invention. Referring to FIG. 4, there is shown a Bezier curve 440, two curve segments 410 and 412 and a Bezier curve maxima point 450. Also, there is shown curvy RHT corners 420, 422, 424, 426 and 428. The maxima point 450 is also an RHT corner. There is also shown a vertical line 402, a curvy RHT 480 and a curvy RHT 482.

The Bezier curve 440 may be similar to the Bezier curve 340. The Bezier curve may comprise a maxima in y at the point 450. The Bezier curve 340 may be decomposed into two curve segments 410 and 412 that may each be single valued in x for each y coordinate and may be joined at the maxima point 450.

The Bezier curve 440 may comprise a portion of a path or boundary around a corresponding closed 2D curve shaped primitive where, an area immediately to the left of the Bezier curve 440 may lie outside of the primitive. All or a portion of the area to the right of the curve and left of the vertical line 402 may be located within the primitive. At least a portion of the vertical line 402 may be located within the interior of a corresponding primitive.

A first curvy RHT 480 may be defined by drawing straight horizontal lines from the endpoints of the curve segment 412 to the vertical line 402. The boundary or perimeter of the first curvy RHT 480 may comprise the curve segment 412, and straight lines connecting the corner 450 to 420, the corner 420 to 424 and the corner 424 to 422.

A second curvy RHT 482 may be defined by drawing straight horizontal lines from the endpoints of the curve segment 410 to the vertical line 402. The boundary or perimeter of the second curvy RHT 482 may comprise the curve segment 410, and straight lines connecting the corner 450 to 420, the corner 420 to 428 and the corner 428 to 426.

In instances when one of the endpoints of a Bezier curve or curve segment, intersects the vertical line 402, one horizontal line may be drawn from the endpoint that does not intersect the vertical line 402, to the vertical line 402. In this instance, the curvy RHT may comprise a curved line that is joined on one end to a horizontal line and on the other end, joined directly to the vertical line 402.

As shown in FIG. 4, curvy RHTs may overlap each other. Also, depending on up and down flow of a corresponding primitive path, portions of a curvy RHT may cover an interior portion of the corresponding primitive and other portions of the curvy RHT may be located outside of the primitive.

In some instances, when a Bezier curve is single valued in x, a corresponding curvy RHT may be formed by drawing horizontal lines from each endpoint of the Bezier curve to an interior vertical line.

In some instances, for example, when cubic Bezier curves are utilized, a curve may be divided into three curve segments, for example, at maxima and minima of the curve and three curvy RHTs may be drawn from the 3 curve segments.

In operation, the mobile multimedia system 105, the mobile multimedia processor 102 and/or the video processing core 200 may comprise suitable logic, circuitry, interfaces and/or code that may be operable to receive and/or generate a 2D primitive comprising a closed shape with a curved boundary, and may be operable to decompose the curved boundary into a path comprising a plurality of Bezier curves and/or curve segments, for example, the curve segments 410 and 412. The plurality of Bezier curves and/or curve segments 410 and 412 may each be single valued in x for each corresponding y coordinate. The mobile multimedia system 105, the mobile multimedia processor 102 and/or the video processing core 200 may be operable to determine curvy RHTs 480 and 482, for each of the Bezier curves and/or curve segments which may comprise the curve segments 410 and 412. In various embodiments of the invention, the curvy RHTs 480 and 482 may be determined by software, for example.

Figure 5:
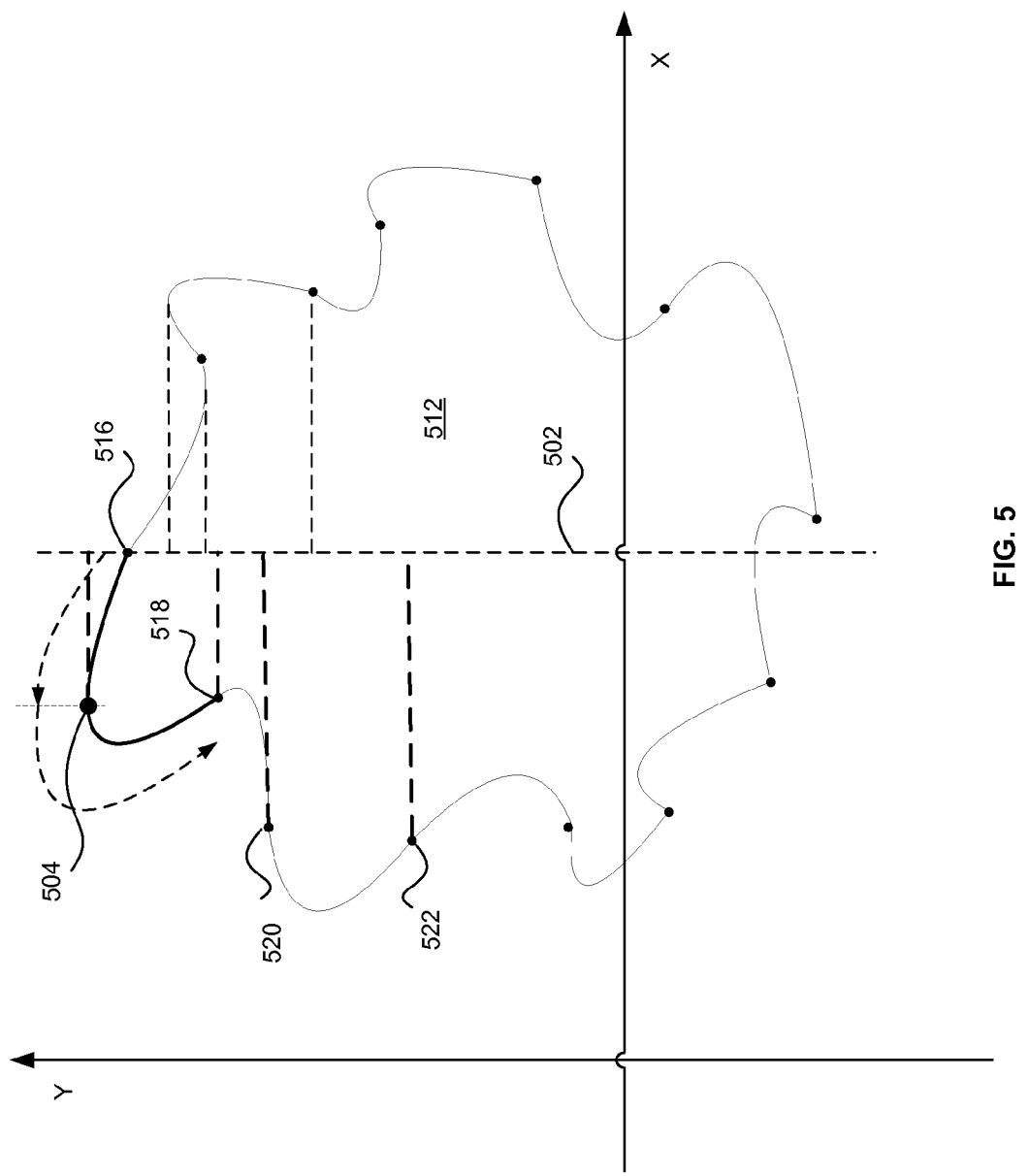
FIG. 5 is a diagram that illustrates an exemplary complex primitive comprising a curved boundary and which is decomposed into a plurality of Bezier curves, in accordance with an embodiment of the invention.

FIG. 5 is a diagram that illustrates an exemplary complex primitive comprising a curved boundary and which is decomposed into a plurality of Bezier curves, in accordance with an embodiment of the invention. Referring to FIG. 5, there is shown, a curved primitive 512, a vertical line 502, a maxima point 504 and a plurality of Bezier curve endpoints, of which, 516, 518, 520 and 522 are identified.

The curved primitive 512 may be generated utilizing Open VG software, for example. The curved primitive 512 may comprise a closed 2-D complex shape that may be bounded by a curved line. The curved primitive 512 may be transformed from model space to view or screen space that comprises an x, y coordinate system, for example. Notwithstanding, the invention is not limited with regard to which coordinate system is utilized and any suitable coordinate system may be utilized. The exterior boundary or perimeter of the curved primitive may be decomposed into a plurality of joined Bezier curves. The plurality of joined Bezier curves may be referred to as a path. Inflection points in the primitive path may occur where an endpoint of one Bezier curve is joined to another Bezier curve. For example, the endpoints 516, 518, 520 and 522 comprise exemplary joined endpoints. The joined Bezier curves may be divided at a maxima and/or a minima in y. For example, a Bezier curve that may span the endpoints 516 and 518, may comprise the maxima point 504. Thus the Bezier curve may be divided into two portions that may be referred to as curve segments. The Bezier curves and/or curve segments may be single valued in x for every y coordinate. For example, one curve segment may span between the endpoint 516 and the maxima point 504 and a second curve segment may span between the maxima point 504 and the end point 518.

Curvy RHTs may be constructed by generating horizontal lines from endpoints of the plurality of Bezier curves and/or curve segments, to the vertical line 502 that is located in the interior of the curved primitive 512 and may extend beyond the interior. The curvy RHTs may overlap each other or and may comprise areas that are interior and/or areas that are exterior with respect to the curved primitive 512.

In instances when one of the endpoints of a Bezier curve or curve segment, intersects the vertical line 502, for example, at the top or bottom of the curved primitive 512, a curvy RHT may have only three sides. A three sided curvy RHT may have one curved side, one vertical side and one horizontal line from the endpoint that does not intersect the vertical line 502, to the vertical line 502.

Areas that are interior and/or areas that are exterior relative to the curved primitive 512, may be determined by traversing the path of the exterior boundary or perimeter of the curved primitive 512 from, for example, the top of the curved primitive 512 to the bottom of the curved primitive 512 on the left side of the vertical line 502. It may be noted that when the y coordinate values are decreasing, areas immediately to the right of the path are interior space of the primitive 512. In instances when the y coordinate values are increasing as the path left of the vertical line is traversed, areas immediately to the right of the path are exterior with respect to the curved primitive 512. The opposite is true when the path to the right of the vertical line 502 is traversed from the top of the primitive 512 to the bottom.

In operation, the mobile multimedia system 105, the mobile multimedia processor 102 and/or the video processing core 200 may comprise suitable logic, circuitry, interfaces and/or code that may be operable to receive and/or generate the curved primitive 512 and may be operable transform the curved primitive 512 to a view space or a screen space. The mobile multimedia system 105, the mobile multimedia processor 102 and/or the video processing core 200 may be operable to decompose the exterior boundary or perimeter of the curved primitive 512 into a path of Bezier curves and/or curve segments that are single valued in x. Moreover, the curved primitive 512 may be decomposed into a plurality of curvy RHTs. The mobile multimedia system 105, the mobile multimedia processor 102 and/or the video processing core 200 may be operable to determine which areas in the view or screen space are interior and exterior with respect to the curved primitive 512.

The mobile multimedia system 105, the mobile multimedia processor 102 and/or the video processing core 200 may be operable to determine which pixels in an array of pixels that may overlay the x, y coordinate system of the view or screen space, are covered by the curved primitive 512. For example, by traversing the path of joined Bezier curves and/or curve segments, horizontal rows of pixels that intersect the path of joined Bezier curves and/or curve segments may be determined. The mobile multimedia system 105, the mobile multimedia processor 102 and/or the video processing core 200 may determine which pixels are covered by the interior of the primitive 512 and which pixels are located in an area that is exterior relative to the curved primitive 512 as described with respect to FIG. 6.

Figure 6:
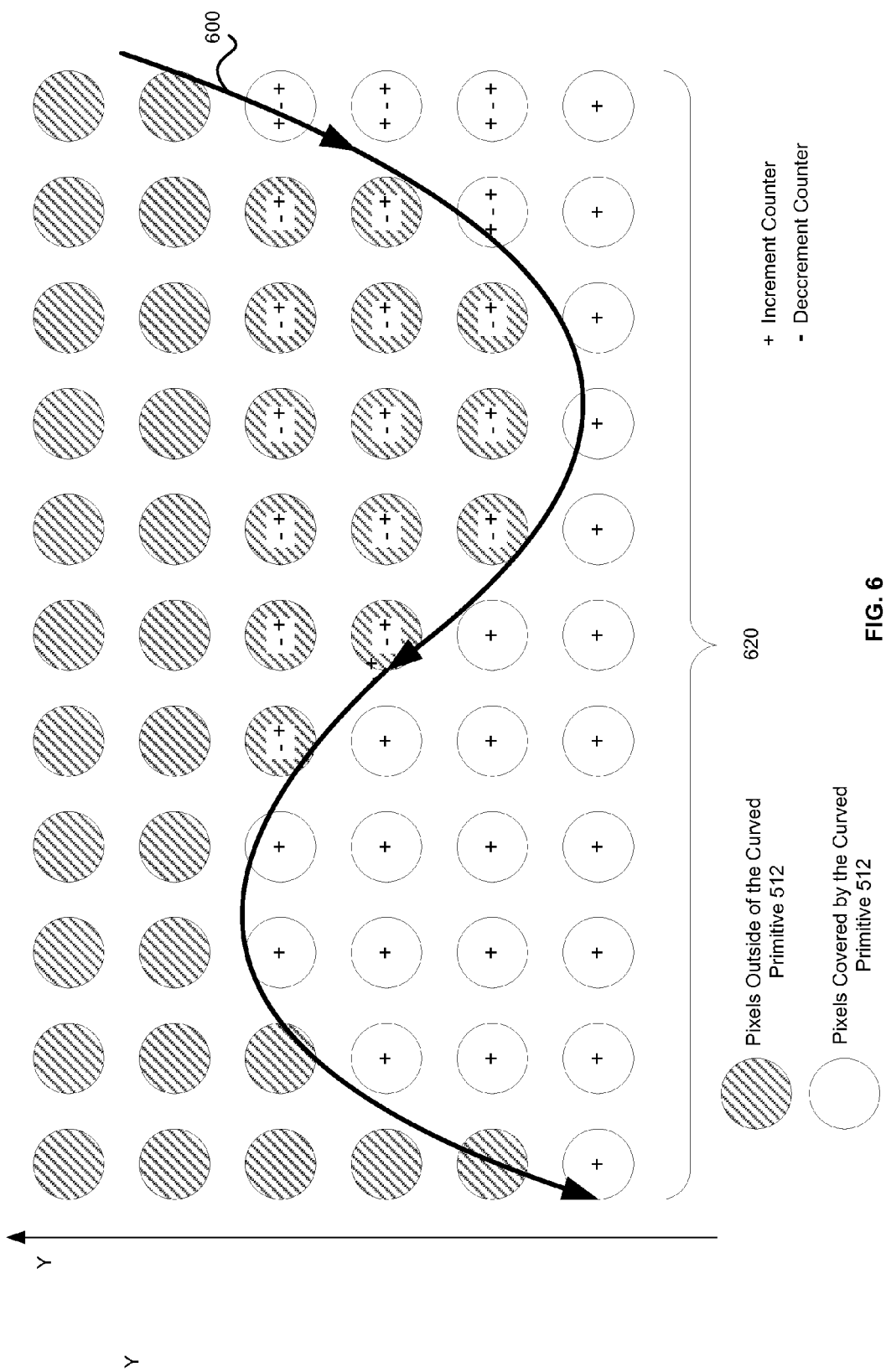
FIG. 6 is a diagram that illustrates an exemplary process that utilizes pixel counters to determine which pixels in a pixel array, are a covered by a curved primitive, and which pixels are outside of the curved primitive, in accordance with an embodiment of the invention.

FIG. 6 is a diagram that illustrates an exemplary process that utilizes pixel counters to determine which pixels in a pixel array, are a covered by a curved primitive, and which pixels are outside of the curved primitive, in accordance with an embodiment of the invention. Referring to FIG. 6, there is shown an array of pixels 620 and a curved primitive path 600.

The curved primitive path 600 may comprise a portion of the exterior boundary or perimeter of the curved primitive 512, for example. The curved primitive path 600 may be composed of a plurality of joined Bezier curves and/or curve segments that are single valued in x for each y coordinate. The curved primitive path 600 may comprise curved sides of a plurality of curvy RHTs as described with respect to FIGS. 3A, 3B and 3C, FIG. 4 and FIG. 5. For example, the curved primitive 512 may be decomposed into a plurality of curvy RHTs that may be similar to the curvy RHTs 480 and 482 described with respect to FIG. 4.

The array of pixels 620 may comprise a portion of pixel locations that may be utilized for displaying an image comprising the curved primitive 512, for example. For each pixel location in the array of pixels 620, one or more pixel counters may be utilized to determine whether a corresponding pixel location is covered by the curved primitive 512 or whether the corresponding pixel location is not covered by the curved primitive 512.

In operation, a coverage mask for identifying which pixels are in the pixel array 620 are covered by the curved primitive 512 may be determined. The mobile multimedia system 105, the mobile multimedia processor 102 and/or the video processing core 200 may be operable to traverse the curved primitive path 600 in a specified direction, for example, from the top of the curved primitive 512 to the bottom of the primitive 512 along the left side of the primitive and then again from the top to the bottom along the right side of the curved primitive 512, however, the invention is not limited in this regard and any suitable direction and or order may be utilized. Portions of the curved primitive path 600 may be traversed iteratively for each curvy RHT that comprise a curved side along the curved path 600.

For each curvy RHT, a portion of the curved primitive path 600 that comprises the curvy RHT, may be traversed in order to locate where one or more horizontal rows of pixels may intersect the curved primitive path 600. In instances when a row of pixels is found, pixel counters for each of the pixels in the row between the curved primitive path 600 and a specified vertical line within the curved primitive, such as the vertical line 502, may be incremented or decremented. For example, when traversing the curved primitive path 600 from the top of the curved primitive 512 to the bottom, along the left side of the vertical line 502, in instances when the direction of traversing the curved primitive path 600 is descending in y, pixel counters for pixel locations located in the found pixel row that are to the right of the curved primitive path 600 and to the left of the vertical line 502, may be incremented. In instances when the direction of traversing the curved primitive path 600 is ascending in y, pixel counters for pixel locations located in the found pixel row that are to the right of curved primitive path 600 and to the left of the vertical line 502 may be decremented. Since curvy RHTs may overlap each other, counters for pixels that are covered by a plurality of overlapping curvy RHTs may be incremented and/or decremented once for each overlying curvy RHT. Pixel locations that may have a positive counter result after all of the curvy RHTs that cover the pixel locations have been processed, may be classified as being within the curved primitive 512 or as covered by the curved primitive 512. Pixel locations that may have a counter result of zero, may be classified as being located outside of the curved primitive 512. In this manner, a mask for identifying which pixels are covered and/or which pixels are not covered by the curved primitive 512 may be determined.

Figure 7:
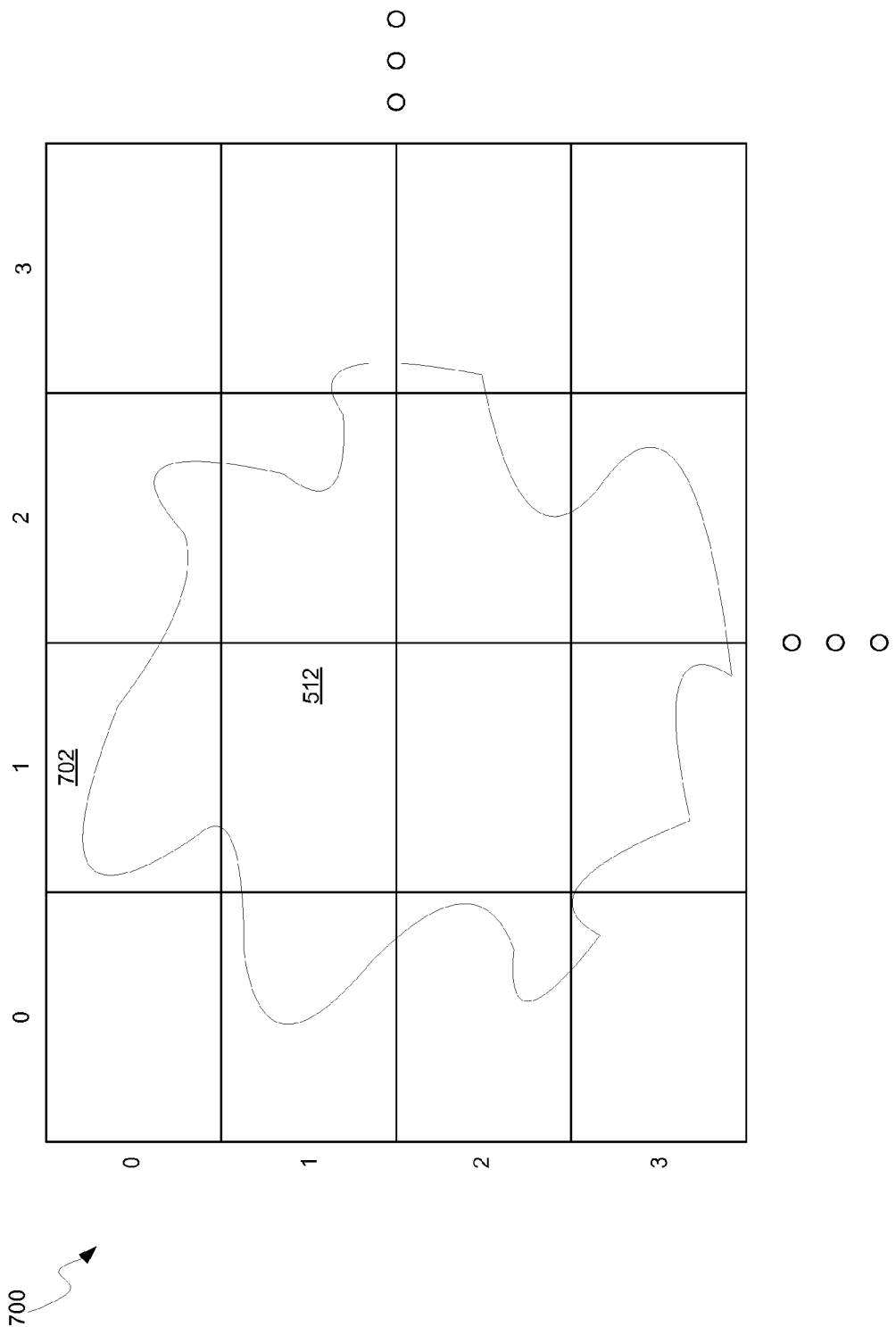
FIG. 7 is a diagram that illustrates an exemplary curved primitive that is represented in a tiled view or screen space, in accordance with an embodiment of the invention.

FIG. 7 is a diagram that illustrates an exemplary curved primitive that is represented in a tiled view space. Referring to FIG. 7, there is shown, a tiled view-space comprising a plurality of tiles 700 of which, the tile 702 is identified. In addition, the curved primitive 512 is shown.

The curved primitive 512 may be composed of a plurality of curvy RHT primitives. A tiled view space which may be referred to as a screen space, may be divided into a plurality of tiles such as the plurality of tiles 700. Each tile within the plurality of tiles 700 may be identified according to its position, for example, the tile 702 may be identified as tile (0, 1). In an exemplary embodiment of the invention, each of the plurality of tiles 700 may comprise a 32×32 block of pixel information, although the invention is not limited in this regard. The curved primitive 512, and/or the corresponding plurality of curvy RHT primitives that may comprise the curved primitive 512 may overlap one or more of the plurality of tiles 700. The primitive 512 and/or the corresponding curvy RHT primitives may be positioned within the tiled view-space in a position that corresponds to their position in the array of pixels 620.

In operation, the curved primitive 512 and/or the corresponding curvy RHT primitives that comprise the curved primitive 512, may be positioned over the plurality of tiles 700 of the tiled view-space during a tile binning phase of graphics rendering. Prior to representation in the tiled view-space, the graphics primitives, for example, may be represented in a model space by graphics software, for example, software based on OpenVG. During the tile binning phase, for each of the plurality of tiles 700 that are covered by the curved primitive 512, the mobile multimedia system 105, the mobile multimedia processor 102 and/or the video processing core 200 may determine which curvy RHT primitives in the curved primitive 512 may overlap each tile. For example, if one or more control points that define a Bezier curve or a curve segment that belongs to a curvy RHT primitive or if any portion of a curvy RHT primitive overlaps a tile, that curvy RHT may be identified as being located within the tile. In various embodiments of the invention, a bounding rectangle about each curvy RHT may be determined and may be utilized for determining which curvy RHTs overlap a tile bin. For each tile in the plurality of tiles 700, information that may identify the curvy RHT primitives and/or the corresponding curved primitive 512 may be stored in memory. For example, tile lists may be generated for each tile in the plurality of tiles 700. The tile lists may comprise each curvy RHT primitive and/or curved primitive that overlaps the tile. In addition, information regarding which pixels in the pixel array 620 that are covered by the primitive 512 may be stored in memory. The memory is described with respect to FIG. 8 and FIG. 9.

Figure 8A:
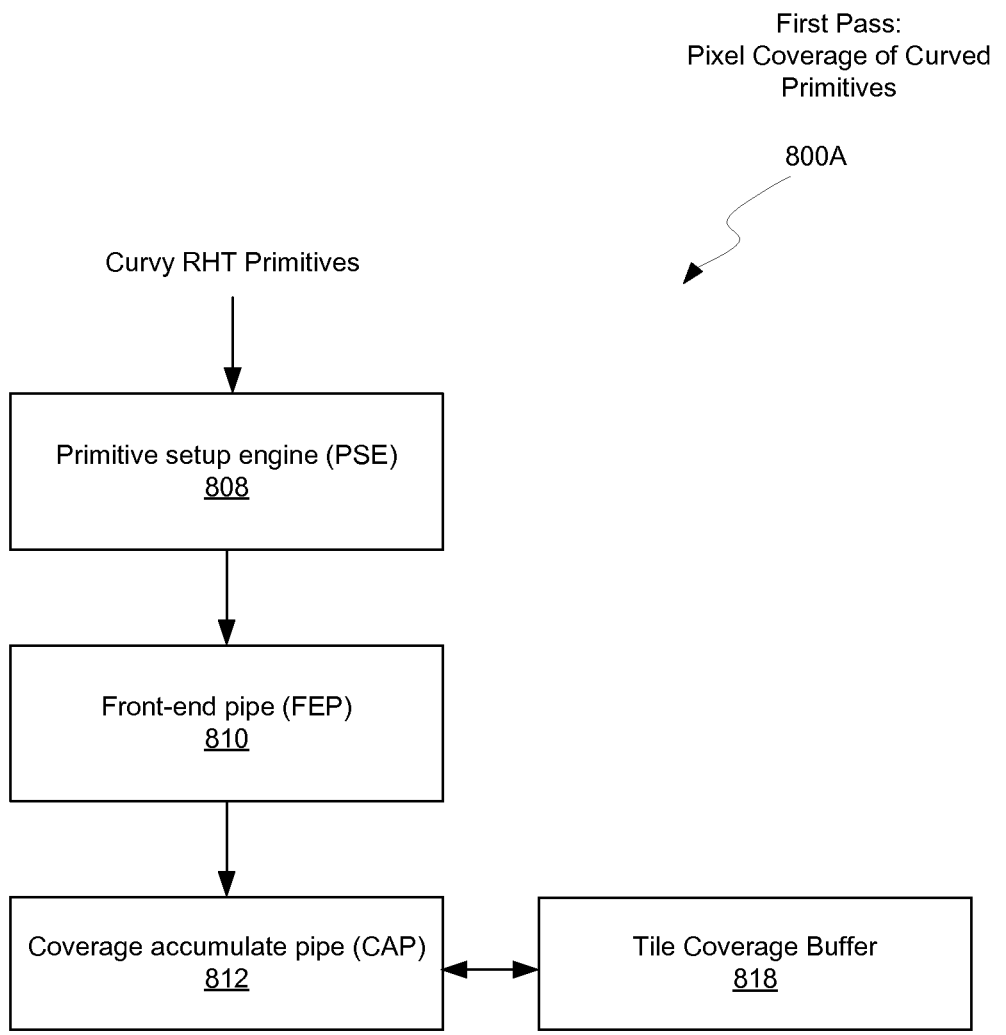
FIG. 8A is a block diagram that illustrates an exemplary architecture that may be utilized for a first pass of tile rendering for curved primitives utilizing curvy RHTs, in accordance with an embodiment of the invention.

FIG. 8A is a block diagram that illustrates an exemplary architecture that may be utilized for a first pass of tile rendering for curved primitives utilizing curvy RHTs, in accordance with an embodiment of the invention. Referring to FIG. 8A, there is shown, a first pass architecture 800A, a primitive setup engine 808, a front-end pipe 810, a coverage accumulate pipe 812 and a tile coverage buffer 818.

Figure 8B:
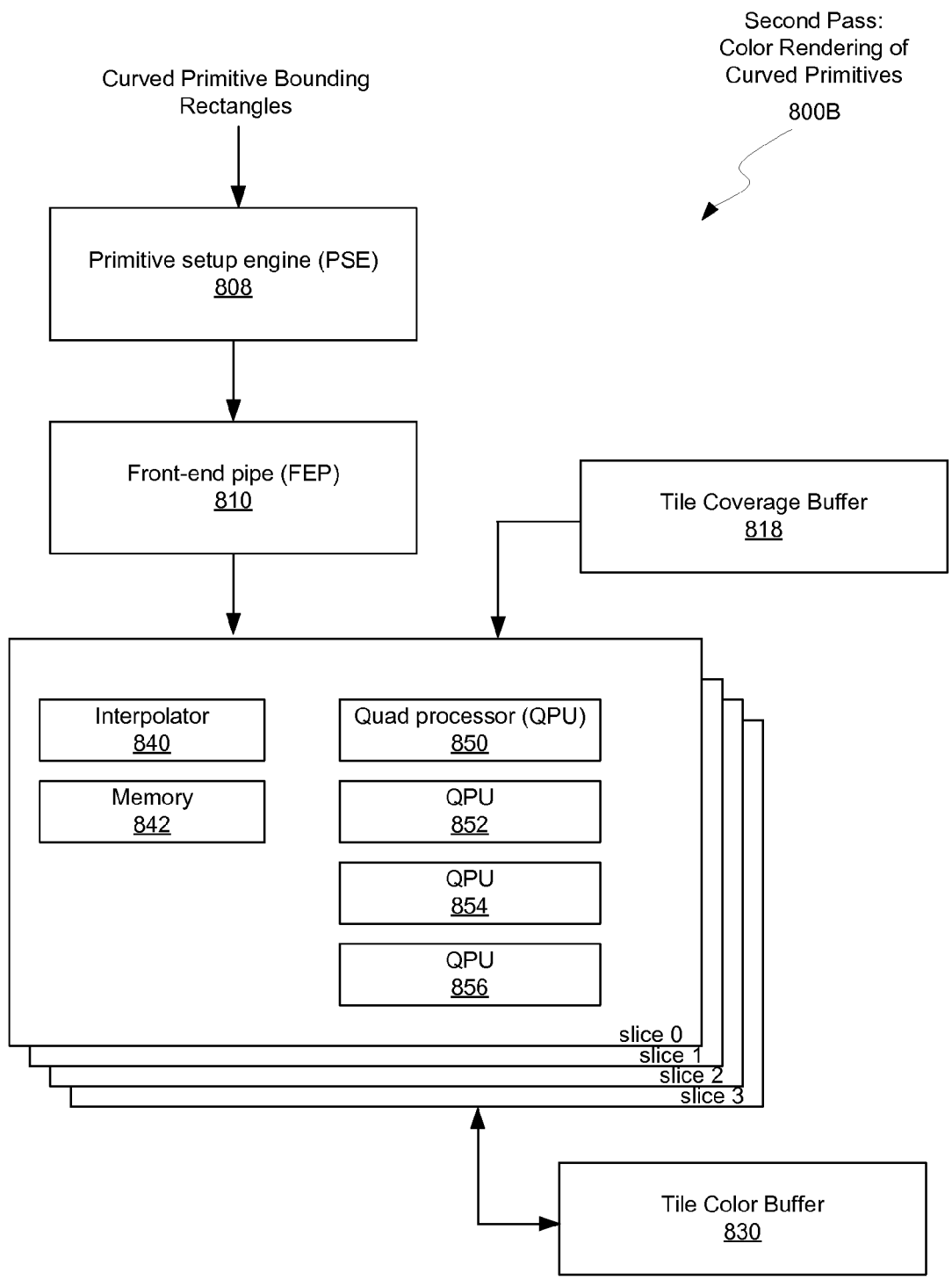
FIG. 8B is a block diagram that illustrates an exemplary architecture that may be utilized during a second pass of rendering curved primitives utilizing curvy RHTs, in accordance with an embodiment of the invention.

The first pass architecture 800A and/or the second pass architecture 800B shown in FIGS. 8A and 8B, may comprise a portion of the 3D pipeline 218 described with respect to FIG. 2 and/or may be implemented within the mobile multimedia system 105 and/or the mobile multimedia processor 102. U.S. patent application Ser. No. 12/942,626 which was filed on Nov. 9, 2010 and is incorporated herein by reference in its entirety, comprises additional information regarding a 3D pipeline architecture that may be configured for use in an exemplary embodiment of the invention. Notwithstanding, the invention is not limited in this regard and any suitable 2D or 3D software, firmware and/or hardware architecture may be utilized for performing determination of pixel coverage, tile binning and/or color rendering of curved primitives utilizing curvy RHT primitives.

The 3D pipeline 218, the first pass architecture 800A and/or the second pass architecture 800B, may comprise a scalable architecture and may comprise a plurality of floating-point shading processors, for example, the quad processor units (QPU) 850, 852, 854 and 856 that are shown in FIG. 8B. In various embodiments of the invention, the 3D pipeline 218, the first pass architecture 800A, the second pass architecture 800B and/or any suitable architecture that may be utilized in an embodiment of the invention, may be operable to support OpenGL-ES and/or OpenVG applications and/or may be utilized in a wide variety of SoC devices.

The primitive setup engine (PSE) 808 may comprise suitable logic, circuitry, interfaces and/or code that may be operable to receive curvy RHT primitives and determine setup parameters that may be utilized to control rasterizing of curvy RHT primitives in the front end pipeline (FEP) 810. The rasterizer setup parameters may be communicated to the front end pipeline (FEP) 810. The PSE 808 may also be operable to determine interpolation coefficients for the curvy RHT primitives that may be communicated to the QPUs 850, 852, 854 and 856 which are described with respect to FIG. 8B.

The front end pipeline (FEP) 810 may comprise suitable logic, circuitry, interfaces and/or code that may be operable to perform rasterizer functions for curvy RHTs and/or for the curved primitive 512, for example. During the second pass of rendering, groups of pixels output by the FEP 810 may be stored into registers that may be mapped into the QPUs 850, 852, 854 and 856 which may be scheduled to carry out color rendering for each group of pixels.

The coverage accumulation pipeline (CAP) 812 may comprise suitable logic, circuitry, interfaces and/or code that may be operable to perform OpenVG coverage rendering. The CAP 812 may be operable to utilize curvy RHT primitives to determine, for example, which pixels in the pixel array 620, may be covered by the curved primitive 512 and which pixels may not be covered.

The tile coverage buffer 818 may comprise suitable logic, circuitry, interfaces and/or code that may be operable to store output from the CAP 812 for use in the second pass of tile rendering, for example, by the QPUs. The tile coverage buffer may be operable to store pixel coverage information for all of the curvy RHT primitives. The tile coverage buffer 818 may be operable to store information regarding which curvy RHTs overlap a tile and/or configuration parameters for processing data in each tile. For example, the tile coverage buffer 818 may be operable to store tile lists for each tile comprising curvy RHTs overlapping each tile.

In various embodiments of the invention, the tile coverage buffer 818 may be configured to handle 64×64 samples and/or may support 32×32 pixel tiles. In other embodiments of the invention, tile coverage buffer 818 may handle 64×64 pixel tiles in non-multi-sample and/or OpenVG 16× coverage modes.

In operation, the 3D pipeline 218 may comprise suitable logic, circuitry, interfaces and/or code that may be operable to perform tile-based rendering of 2D curved primitives that may comprise closed complex shapes, in two phases such as a tile binning phase and a tile rendering phase. The 2D curved primitives that may comprise closed complex shapes may be referred to as curved primitives and may comprise the curved primitive 512. During a pre-processing phase that may be performed in software, for example, the curved primitives may be decomposed into a plurality of curvy RHT primitives. The curvy RHT primitives may overlap each other and may cover areas inside and outside of area covered by the curved primitive, as described with respect to FIGS. 3A, 3B and 3C, FIG. 4 and FIG. 5. Tile binning may also be performed wherein curvy RHT primitives that overlap a tile may be associated with the tile and the corresponding tile information may be stored in memory, for example, in the tile coverage buffer 818. The tile binning phase is described with respect to FIGS. 1B, 2, 4, 5 and 7, for example.

The FEP 810 and the CAP 812 may be operable to generate a pixel coverage mask for the curved primitives, for example, the curved primitive 512. For example, the mask may be determined for pixels in the array of pixels 620 which are covered by the curved primitive 512. In this regard curvy RHTs that may be determined for the curved primitive 512, may be utilized to determine which pixels are covered, as described with respect to FIG. 5 and FIG. 6. In various embodiments of the invention, the pixel coverage may be determined on a tile basis. The coverage information may be stored in the tile coverage buffer 818. A second pass of rendering curved primitives utilizing curvy RHTs is described with respect to FIG. 8B.

FIG. 8B is a block diagram that illustrates an exemplary architecture that may be utilized during a second pass of rendering curved primitives utilizing curvy RHTs, in accordance with an embodiment of the invention. Referring to FIG. 8B, there is shown, a second pass architecture 800B, the primitive setup engine 808, the front-end pipe 810, the tile coverage buffer 818, a tile color buffer 830, a plurality of quad processor units 850, 852, 854 and 856, the memory 842 and an interpolator 840.

The tile color buffer 830 may comprise suitable logic, circuitry, interfaces and/or code that may be operable to store color rendered pixel data for curved primitives, such as the curved primitive 512. The tile color buffer 830 may be communicatively coupled to the QPUs 850, 852, 854 and 856. The tile color buffer 830 may be configured to handle 64×64 samples and/or may support 32×32 pixel tiles. In other embodiments of the invention, the tile color buffer 830 may handle 64×64 pixel tiles in non-multi-sample and/or OpenVG 16× coverage modes. The tile color buffer 830 may also be configured to handle 64×32 samples with 64-bit floating-point color for HDR rendering, for example. The tile color buffer 830 may be operable to write decimated color data to a main memory frame buffer, for example, the SDRAM 140 described with respect to FIG. 1B, when rendering of a tile is complete. The tile color buffer 830 may store and/or reload the tile data to and/or from memory using data compression The quad processors (QPU) 850, 852, 854 and 856 may comprise suitable logic, circuitry, interfaces and/or code that may be operable to perform tile based color and/or texture shading of curved primitives such as the curved primitive 512. The QPUs 850, 852, 854 and/or 856 may comprise multiple instances of a special purpose floating-point shader processor. In various embodiments of the invention, each of the QPUs 850, 852, 854 and/or 856 may comprise a 16-way single instruction multiple data (SIMD) processor, for example, that may be operable to process streams of quads of pixels, however, the invention is not limited in this regard. The QPUs may be organized into groups of 4, for example, that may be referred to as slices. The QPUs 850, 852, 854 and/or 856 may share resources, for example, the interpolator 840 and/or the memory 842 which may be utilized for storing instructions, coefficients and/or texture information, for example. The QPUs 850, 852, 854 and/or 856 may receive tile and/or pixel coverage data from the tile coverage buffer 818 and may communicate color rendered data to the tile color buffer 830.

In operation, a second pass of rendering curved primitives may comprise color rendering. Tile lists, tile coverage masks and/or curved primitive data such as color and/or light attributes, for each covered tile, may be sent to the primitive setup engine (PSE) 808 or may be fetched by the PSE 808. The PSE 808 may be operable to determine setup information that may be utilized for rasterization in the FEP 810. In addition, the PSE 808 may be operable to determine coefficients for interpolating shading values, for example. Output from the PSE 808 may be sent to the front end pipeline (FEP) 810. The FEP 810 may determine which pixels may be utilized for rendering the curved primitive 512 and/or the corresponding curvy RHTs in each tile. Output from the FEP 810, for example, the pixel coverage information and/or coefficients may be sent to one or more QPUs, for example, the QPUs 850, 852, 854 and/or 856.

The QPUs 850, 852, 854 and/or 856 may be operable to receive, from the tile coverage buffer 818, curved primitive data and/or curvy RHT data corresponding to each tile that is overlapped by the curved primitive 512 and/or the corresponding curvy RHTs, for example. In addition, the QPUs

850, 852, 854 and/or 856 may receive a mask corresponding to pixel coverage for the curved primitive 512 for each tile that is covered by the curved primitive 512. The QPUs 850, 852, 854 and/or 856 may be operable to color render, in parallel, curved primitive data in each tile and may output the color rendered pixel output to the tile color buffer 830.

The pixels covered by the curved primitive 512 may be rendered with color, light and/or texture, for example. Rendering may be handled in a plurality of threads which may be referred to as pipelines. For example, two processing threads may perform the coverage first pass and/or the color rendering second pass. In various embodiments of the invention, the color rendering pass may be performed on one set of data concurrently with the coverage first pass for another set of data. For example, when a set of data has been processed by a coverage pass pipeline, output from that set of data may be processed by a color shading pipeline.

Color rendering pixels by tiles rather than by frames may enable improved memory bandwidth and/or improved processing performance, however, the invention is not limited in this regard.

Figure 9:
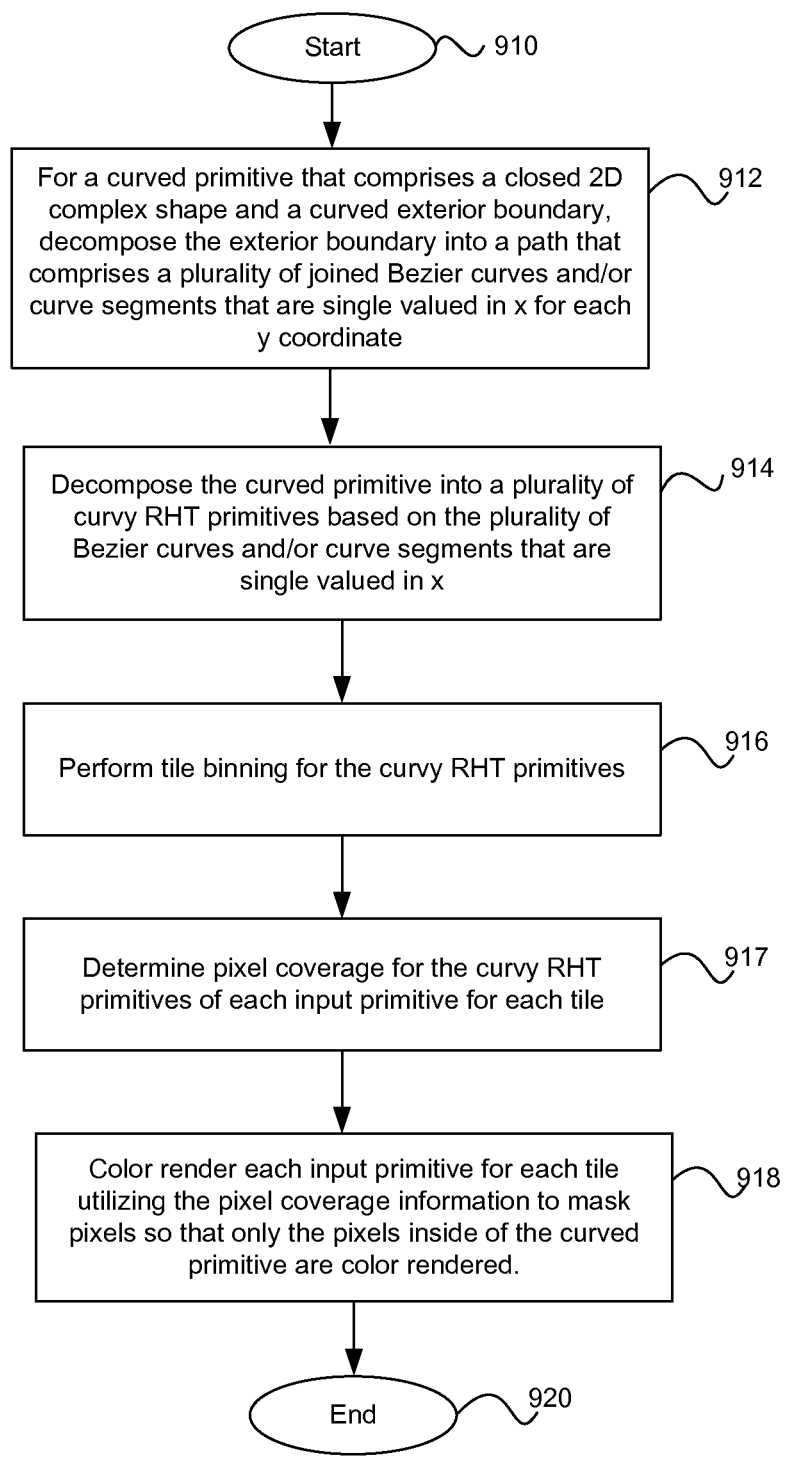
FIG. 9 is a flow chart illustrating exemplary steps for rasterizing and rendering curved primitives utilizing curvy RHTs, in accordance with an embodiment of the invention

FIG. 9 is a flow chart illustrating exemplary steps for rasterizing and rendering curved primitives utilizing curvy RHTs, in accordance with an embodiment of the invention. The exemplary steps may begin at step 910. In step 912, for a curved primitive 512 that comprises a closed 2D complex shape and a curved exterior boundary, a curved exterior boundary may be decomposed into a path that comprises a plurality of joined Bezier curves and/or curve segments that are single valued in x for each y coordinate, for example, such as the curve segments 410 and 412. In step 914, the curved primitive 512 may be decomposed into a plurality of curvy RHT primitives, such as the primitives 480 and 482, based on the plurality of Bezier curves and/or curve segments 410 and 412 that are single valued in x. In step 916, tile binning may be performed for the curvy RHT primitives 480 and 482 and/or for the curved primitive 512. In step 917, pixel coverage may be determined for the curvy RHT primitives 480 and 482 and/or for the curved primitive 512. In step 918, each input primitive for each tile, for example, the tile 702 that may comprise curvy RHT primitives, may be color rendered utilizing the pixel coverage information to mask pixels so that only the pixels inside of the curved primitive are color rendered. The exemplary steps may end at step 920.

In an embodiment of the invention, a curved primitive, for example, the curved primitive 512, that comprises a closed 2D complex shape, may be decomposed into a plurality of curvy RHT primitives such as the curvy RHTs 480 and/or 482. Pixel rows that may be covered by each of the plurality of curvy RHT primitives may be determined. The pixels rows may comprise a portion of the pixel array 620, for example. For each of the plurality of curvy RHT primitives, pixel counters for each pixel covered by each of the plurality of curvy RHT primitives may be incremented or decremented as described with respect to FIG. 6. Pixels which are covered by the curved primitive 512 may be determined based on the pixel counters. Tile based color rendering of the curved primitive 512 may be performed for the pixels that are determined to be covered by the curved primitive 512.

The curved primitive 512 may comprise a curved exterior boundary that may be decomposed into a plurality of joined Bezier curves and/or curve segments, such as the Bezier curve segments 410 and 412. The joined Bezier curves or curve segments may be single valued in x for each y coordinate. The plurality of curvy RHT primitives, for example, the curvy RHTs 480 and/or 482 may each comprise a curved portion that may comprise one or more of the Bezier curves and/or one or more of the curve segments, for example, the curve segments 410 and 412. The plurality of curvy RHT primitives may also comprise two horizontal lines connected to the curved portion and a vertical line, for example, the vertical line 402, which may intersect the curved primitive 512, for example. One or more of the plurality of curvy RHT primitives may overlap at least a portion of one or more other of the plurality of curvy RHT primitives. For example, the curvy RHT 480 may overlap the curvy RHT 482. A portion of one or more of the plurality of curvy RHT primitives may cover one or more pixels that are not covered by the curved primitive 512.

The pixel rows within each of the plurality of curvy RHT primitives may be located by traversing a path along a curved portion of each of the curvy RHT primitives, for example, along the path between the points 422 and 450 and/or between the points 450 and 426, for example. The choice of incrementing or decrementing the pixel counters may be determined utilizing a direction of traversing the path along the curved portion of the plurality of curvy RHT primitives.

Information that identifies the pixels which are determined to be covered by the curved primitive 512 may be stored in memory, for example, in the tile coverage memory 818. The plurality of curvy RHT primitives and/or the curved primitive 512 that may overlap one or more of a plurality of tiles in the tiled view space 700 may be determined. Information that identifies which of the curvy RHT primitives overlaps which of the plurality of tiles in the tiled view space 700 may be stored in memory, for example, in the tile coverage buffer 818. The tile based color rendering of the curved primitive 512 may be performed for a plurality of tiles that overlap the curved primitive 512. Pixels may be rendered in parallel. The curved primitive 512 may be rendered in two phases comprising a tile binning phase and a tile rendering phase. The tile rendering phase may comprise a first pass which determines pixels covered by the curved primitive and a second pass which color renders the determined covered pixels. In this manner curvy RHT primitives such as the curvy RHTs 480 and/or 482 may be utilized for rasterizing and/or rendering complex shapes such as the curved primitive 512.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for decomposing complex shapes into curvy RHTs for rasterization.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a graphics processing device:
   decomposing a curved primitive that comprises a closed two-dimensional complex shape into multiple curvy right horizontal trapezium (RHT) primitives;
   locating pixel rows that are covered by a specific curvy RHT primitive among the multiple curvy RHT primitives;
   for the specific curvy RHT primitive, determining pixels in the pixel rows that are covered by the curved primitive; and
   tile-based color rendering the pixels covered by the curved primitive.

2. The method according to claim 1, wherein:
   the curved primitive comprises a curved exterior boundary that is decomposed into a multiple of joined Bezier curves, curve segments, or a combination of both, that are single valued in x for each y coordinate; and
   the specific curvy RHT primitive comprises a curved portion that comprises one or more of the Bezier curves, one or more of the curve segments, or both, a horizontal line connected to the curved portion, and a vertical line that intersects the curved primitive.

3. The method according to claim 1, wherein the specific curvy RHT primitive among the multiple curvy RHT primitives overlaps at least a portion of another of the multiple curvy RHT primitives.

4. The method according to claim 1, wherein a portion of the specific curvy RHT primitive among the multiple curvy RHT primitives covers one or more pixels that are not covered by the curved primitive.

5. The method according to claim 1, comprising locating the pixel rows covered by the specific curvy RHT primitive by traversing a path along a curved portion of the specific curvy RHT primitive.

6. The method according to claim 1, further comprising, for the specific curvy RHT primitive:
   incrementing or decrementing a pixel counter for each pixel covered by the specific curvy RHT primitive among the multiple curvy RHT primitives; and
   determining the incrementing or the decrementing utilizing a direction of traversing a path along a curved portion of the specific curvy RHT primitive.

7. The method according to claim 1, further comprising:
   determining which of the multiple curvy RHT primitives or the curved primitive overlaps which tiles in a tiled view space; and
   storing, in memory, information that identifies which of the multiple curvy RHT primitives overlaps which tiles in the tiled view space.

8. The method according to claim 1, comprising performing the tile-based color rendering of multiple of the pixels covered by the curved primitive in parallel.

9. The method according to claim 1, wherein the tile-based color rendering comprises rendering the pixels covered by the curved primitive in two phases, the two phases comprising:
   a tile binning phase; and
   a tile rendering phase, wherein the tile rendering phase comprises a first pass which determines the pixels covered by the curved primitive and a second pass which color renders the pixels.

10. A system comprising:
    circuitry for use in a graphics processing device, wherein the circuitry is operable to:
    decompose a curved primitive that comprises a closed two-dimensional complex shape into multiple curvy right horizontal trapezium (RHT) primitives;
    locate pixel rows that are covered by a specific curvy RHT primitive among the multiple curvy RHT primitives;
    for the specific curvy RHT primitive, determine pixels in the pixel rows that are covered by the curved primitive; and
    tile-based color rendering the pixels covered by the curved primitive.

11. The system according to claim 10, wherein:
    the curved primitive comprises a curved exterior boundary that is decomposed into a multiple of joined Bezier curves, curve segments, or a combination of both, that are single valued in x for each y coordinate; and
    the specific curvy RHT primitive comprises a curved portion that comprises one or more of the Bezier curves, one or more of the curve segments, or both, a horizontal line connected to the curved portion, and a vertical line that intersects the curved primitive.

12. The system according to claim 10, wherein the specific curvy RHT primitive among the multiple curvy RHT primitives overlaps at least a portion of another of the multiple curvy RHT primitives.

13. The system according to claim 10, wherein a portion of the specific curvy RHT primitive among the multiple curvy RHT primitives covers one or more pixels that are not covered by the curved primitive.

14. The system according to claim 10, wherein the circuitry is operable to locate the pixel rows covered by the specific curvy RHT primitive by traversing a path along a curved portion of the specific curvy RHT primitive.

15. The system according to claim 10, wherein, for the specific curvy RHT primitive, the circuitry is further operable to:
    increment or decrement a pixel counter for each pixel covered by the specific curvy RHT primitive among the multiple curvy RHT primitives; and
    determine the incrementing or the decrementing utilizing a direction of traversing a path along a curved portion of the specific curvy RHT primitive.

16. The system according to claim 10, wherein the circuitry is further operable to:
    determine which of the multiple curvy RHT primitives or the curved primitive overlaps which tiles in a tiled view space; and
    store, in memory, information that identifies which of the multiple curvy RHT primitives overlaps which tiles in the tiled view space.

17. The system according to claim 10, wherein the circuitry is operable to perform the tile-based color rendering of multiple of the pixels covered by the curved primitive in parallel.

18. The system according to claim 10, wherein the circuitry is operable to tile-based color render the pixels covered by the curved primitive in two phases, the two phases comprising:
    a tile binning phase; and
    a tile rendering phase, wherein the tile rendering phase comprises a first pass which determines the pixels covered by the curved primitive and a second pass which color renders the pixels.

19. A system comprising:
    processing circuitry configured to:
        decompose a curved primitive that comprises a closed two-dimensional shape into a set of curvy right horizontal trapezium (RHT) primitives that includes a first curvy RHT primitive;
        locate a pixel row covered by the first curvy RHT primitive;
        determine a pixel in the pixel row that is covered by the curved primitive; and
        tile-based color render the pixel covered by the curved primitive.

20. The system according to claim 19, wherein:
    the curved primitive comprises a curved exterior boundary that is decomposed into a multiple of joined Bezier curves, curve segments, or a combination of both, that are single valued in x for each y coordinate; and
    the first curvy RHT primitive comprises a curved portion that comprises one or more of the Bezier curves, one or more of the curve segments, or both, a horizontal line connected to the curved portion, and a vertical line that intersects the curved primitive.

* * * * *